United States Patent [19]
Armitage

[11] Patent Number: 5,475,589
[45] Date of Patent: Dec. 12, 1995

[54] SYSTEM FOR EVALUATING SEISMIC SEQUENCE LITHOLOGY AND PROPERTY, AND FOR EVALUATING RISK ASSOCIATED WITH PREDICTING POTENTIAL HYDROCARBON RESERVOIR, SEAL, TRAP OR SOURCE

[75] Inventor: Kenneth R. L. Armitage, Bec, France

[73] Assignee: Spiral Holding, Ltd., St. Peter Port, United Kingdom

[21] Appl. No.: 135,122

[22] Filed: Jul. 8, 1993

[30] Foreign Application Priority Data

Jul. 8, 1992 [GB] United Kingdom ............... 9214482

[51] Int. Cl.⁶ ........................ G01V 1/00; G06F 15/58; G06G 7/48
[52] U.S. Cl. ........................ 364/421; 73/152; 364/422; 367/38; 367/59
[58] Field of Search ................... 73/152; 364/421, 364/422, 420; 367/38, 59, 73, 25

[56] References Cited

U.S. PATENT DOCUMENTS

| | | | |
|---|---|---|---|
| 4,316,250 | 2/1982 | Vincent | 364/422 |
| 4,562,558 | 12/1985 | Ostrander | 367/68 |
| 4,571,710 | 2/1986 | Neidell et al. | 367/38 |
| 4,692,910 | 9/1987 | Sondergeld et al. | 367/75 |
| 4,712,424 | 12/1987 | Herron | 73/152 |
| 4,722,220 | 2/1988 | Herron | 73/152 |
| 4,821,242 | 4/1989 | Hennington | 367/53 |
| 4,903,527 | 2/1990 | Herron | 73/152 |
| 4,914,944 | 4/1990 | Herron et al. | 73/152 |
| 5,136,551 | 8/1992 | Armitage | 367/38 |

FOREIGN PATENT DOCUMENTS 9214482  7/1992  United Kingdom .

OTHER PUBLICATIONS

Li et al.; "XPROS—A Fuzzy Expert System for Prospect Appraisal"; *Revue De L Institut Francais Du Petrole;* 1992; v47, n3 (May–Jun.); pp. 315–332; (Dialog: File 434, acc#11654166).

Chiupka et al.; "Application of Normalized Velocities for Depth Conversion of the Bookabourdie Field, Cooper Basin, S.A"; *Exploration Geophysics;* vol. 23, No. 3; pp. 481–487; Sep. 1992; (Dialog: File 2, acc#4537577).

Chen et al.; "A New Method for Prospect Appraisal"; *AAPG Bulletin–American Association of Petroleum Geologists, 1993;* v77, n1 (Jan.); pp. 9–18; ISSN: 0149–1423; (Dialog: File 434, acc# 12031928).

Bulat & Stoker, Uplift Determination from Interval Velocity Studies pp. 293–305, Petroleum Geology of NW Europe 1987.

Wyllie et al, Elastic Wave Velocities in Heterogeneous & Porous Media Geophysics, vol. 21, No. 1, 1956, pp. 41–70.

Gardner, et al., Formation Velocity and Density Geophysics, vol. 39, No. 6, 1974, pp. 770–780.

(List continued on next page.)

Primary Examiner—Robert A. Weinhardt
Assistant Examiner—Stephen R. Tkacs
Attorney, Agent, or Firm—Harrison & Egbert

[57] ABSTRACT

A method for translating seismic time data via seismic depth data to seismic depth/lithology data, enabling reduced-risk location of hydrocarbons. Reducing dry hole risk is accomplished by introducing a new work domain which provides a several-fold increase in parameters per data point corresponding to geophysical space and associated with seismic sequence data. This work domain provides improved separation and definition and quality control of a panoply of relevant geofactors which in turn provide enhanced material information about a plurality of sedimentary rock properties. The enhanced material information is quality-controlled to be geologically possible, then further quality-controlled to be consistent with probability via quantification of burial history, depositional facies distribution and data resolution.

7 Claims, 15 Drawing Sheets

OTHER PUBLICATIONS

Brown, Interval Velocity Studies in the Southern North Sea GECO Exploration Services paper.

Feder, Integrated Interpretation for Exploration Oil & Gas J., 1986 pp. 180–187.

Marsden, Layer Cake Depth Conversion Geophysics 1989 pp. 10–14.

Ade et al., F–Test, Isochran and Seismic Facies Analysis Singapore Seismic Stratigraphy Section 1983.

Carter, Depth Conversion Using Normalized Interval Velocities Geophysics 1989 pp. 15–16.

Spiral Feasibility Study PEP Research 1993.

An Investigation into Discrimance Between Sonic Log and Seismic Velocities Goetz et al. APEA 1979.

Rist, Sophisticated Automated Techniques in Seismic Exploration.

Domenico, Determine Lithology/Porosity from Pond S–Wave Velocities World Oil 1984 pp. 142A–G.

Sangree et al. Interpretation of Depositional Facies From Seismic Data Exxon Production Research paper.

Jones, Balanced Cross–Sections Geophysics 1988 pp. 29–31.

Stone, Geophysical Hydrocarbon Indicators European Assoc. of Exploration Geophysicists 1974.

Stork, Stable Determination of Internal Velocities Offshore Technology Conference 1992.

work flow summary

FIG. 2

| Sequence Task, | Property, | | Factor |
|---|---|---|---|
| Reservoir | Lithology | 1 | # |
| | Porosity | 2 | # |
| | Age, History | 3 | # |
| | Permeability | 4 | #? |
| | Thickness | 5 | # |
| | Net / Gross | 6 | #? |
| Seal[s] | Lithology | 1 | |
| | Porosity | 2 | |
| | Age, History | 3 | |
| | Permeability | 4 | |
| | Thickness | 5 | |
| Trap | Crest Depth | 7 | # |
| | Gross Rock Volume | 8 | # |
| | Vertical Closure | 9 | # |
| | Age, History | 3 | " |
| | Degree of Fill | 10 | #? |
| | Fluid Saturation | 11 | ? |
| | Expansion Factor | 12 | ? |
| | Recovery Factor | 13 | ? |
| | Post process tectonics | 14 | # |
| | Reserve in place | 15 | # |
| | Recoverable Reserve | 16 | # |
| Source | Lithology | 1 | " |
| | Porosity | 2 | " |
| | Age, History | 3 | " |
| | Permeability | 4 | " |
| | Volumes | 8 | " |
| | Richness | 17 | #? |
| | Maturity | 18 | # |
| | Post process tectonics | 14 | " |
| | Type | 19 | #? |
| | Migration, loss | 20 | # |

Factors for definition - 20.
    #   Definition & risk improved by Spiral = 12 / 20
   #?   Probably     "     "     "  = 5 / 20
    ?    Possibly      "     "     "  = 3 / 20

FIG. 3
Causes for Dry Holes
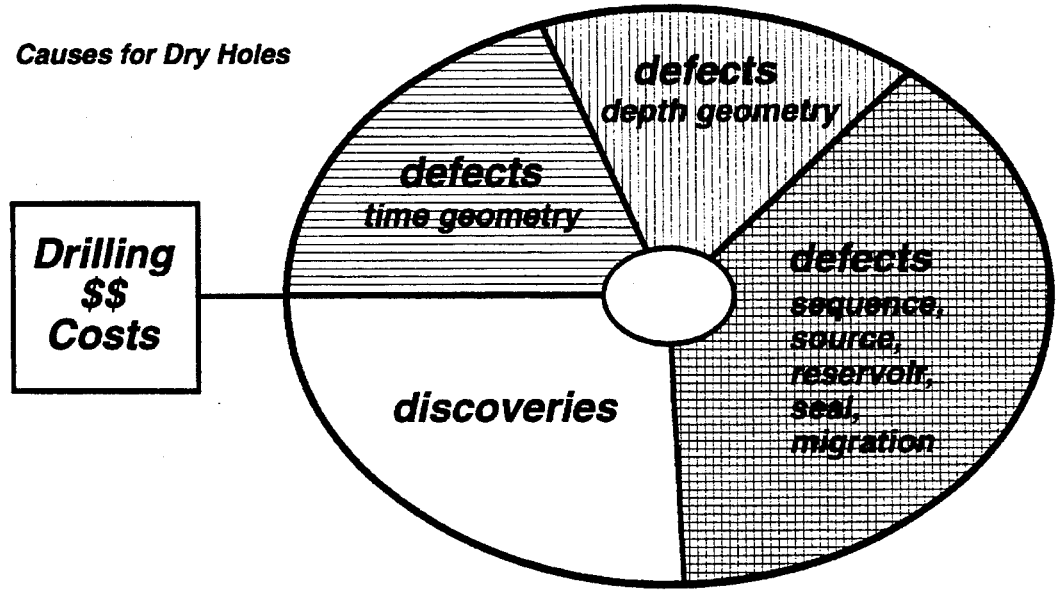
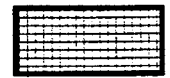
Most dry holes are caused by error in risk or interpretation of rock properties.
i.e. depth geometry
or source, reservoir, seal.

*detailed work flow*

Spiral domain sequence s.p.
property development

Sequence apparent behavior
range in a basin,
[all control data]

FIG. 7
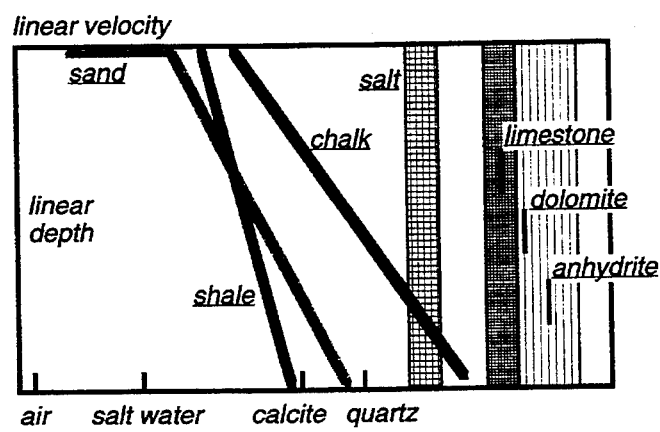
Velocity, Depth, Lithology, Schematic
FIG. 8
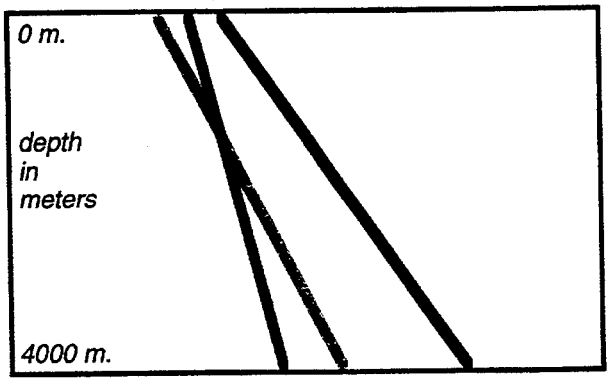
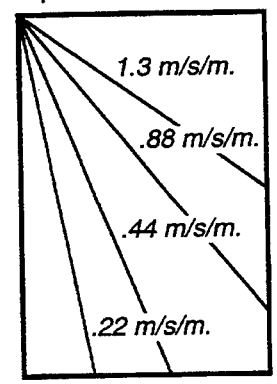

FIG. 9
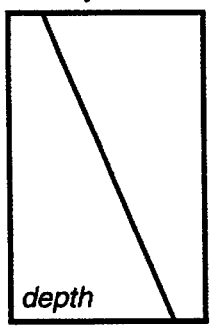
velocity / depth — Deposition
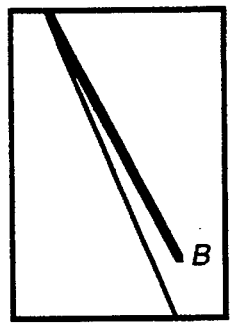
Burial Changes to Velocity / Compaction
A, B, C [Extension only]
Single processes
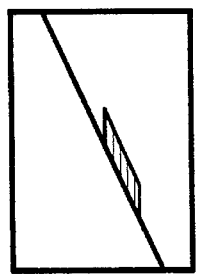
Salt Inversion
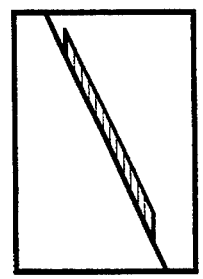
Basin Inversion
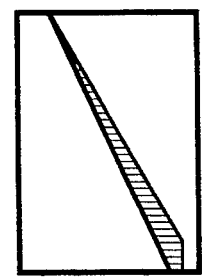
Compression, Non Vertical
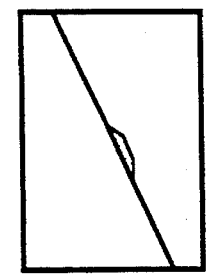
Faulting
Cumulative processes
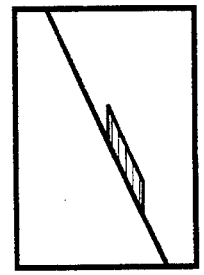
Most non-normal burial changes move velocity to the right.
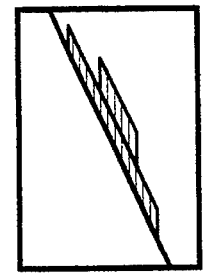
*velocity 'pull ups',
*artificial depth highs,
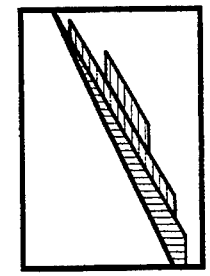
*apparent compaction rates to accelerate.
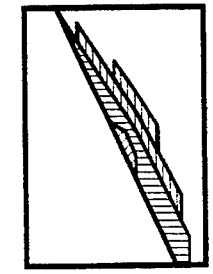

*R.V.V.'s, or burial anomalies, on local sequence behavior.*

*Normal burial on local sequence behavior.* clastic ratios clastic / carbonate ratios coarse clastic property
conversion grid, to access
data base of properties.

[schematic]

carbonate property
conversion grid, to access
data base of properties.

[schematic]

FIG. 17

Risk Assembly

|  | Per control point, by value / gradient | | Per unit area / volume of sequence / shotpoint or grid unit | Per overall volume of component |
|---|---|---|---|---|
| time | * | * | * | * |
| velocity | * | * | * | * |
| depth | * | * | * | * |
| lithology | * | * | * | * |
| compaction | * | * | * | * |
| volume | * | * | * | * |
| resolution | * | * | * | * |
| Burial | | | | |
|    normal | * | * | * | * |
|    conva | * | * | * | * |
|    binva | * | * | * | * |
|    sinva | * | * | * | * |
|    penva | * | * | * | * |
|    tenva | * | * | * | * |
|    other | * | * | * | * |
| Deposition | | | | |
|    lithology | * | * | * | * |
|    compaction | * | * | * | * |
|    environment | * | * | * | * |
|    form | * | * | * | * |
| Present | | | | |
|    Velocity & depth | * | * | * | * |
| Normalized deposition | | | | |
|    Velocity & depth | * | * | * | * |
| Property Conversion | | | | |
| users well compilation | * | * | * | * |
| Identification of | | | | |
|    reservoir | * | * | * | * |
|    seal | * | * | * | * |
|    source | * | * | * | * |
|    migration route | * | * | * | * |
|    trap | * | * | * | * |
|    reserves | * | * | * | * |
|    risk | * | * | * | * |

FIG. 19

<u>Table of Lithologies, Preparation of Property conversion Grids</u>

Clastics      Fine to coarse. Use percentiles, minimum 25% steps.
              [add grid from Fine down to water velocity for overpressures]
              To quartzites Clastic / carbonate mixes.      Use percentiles, minimum 25% steps.

Chalks, [on possible cementation variations]

Pure limestones      Massive limestones      Reef limestones

Evaporites      salt [& + clastic in %],      anhydrites      dolomites

Igneous      Extrusives      dykes / sills

SYSTEM FOR EVALUATING SEISMIC SEQUENCE LITHOLOGY AND PROPERTY, AND FOR EVALUATING RISK ASSOCIATED WITH PREDICTING POTENTIAL HYDROCARBON RESERVOIR, SEAL, TRAP OR SOURCE

BACKGROUND

This invention relates generally to geophysical prospecting and exploration, and more particularly relates to methods and means for evaluating seismic sequence lithology and property, and for using such evaluation to predict potential hydrocarbon reservoir, seal, trap or source, and the risk associated with such predictions.

It is well known that economic location and development of hydrocarbons is constrained by unprognosticated dry holes and high costs associated with such waste. Recent data compiled from existing exploration databases, e.g., compiled by Bec of Bruniquel, France and by S. N. Elf Aquitaine P., Pau, Dept. M.S.S., suggests that some 75% of exploration wells and over 50% of all wells drilled are dry. Of such dry wells, approximately 25% are associated with errors in spatial geometric prognosis of material evidence defined in seismic time and approximately 75% are caused by present inability of artisans to effectively apply geoscience to determine, within seismic sequences, those sedimentary rock properties identified in FIG. 2.

A finite number of single geological or geophysical causes exist with potential to modify the panoply of properties defined in FIG. 2 to the extent necessary to cause a substantially erroneous prognosis to occur. These causes or factors may be conveniently termed "geofactors" and all such geofactors which are present within a particular prospective basin and the like are relevant to the industrial risk equation. That is, there is inherently a risk involved with the prognostication, by those skilled in the art, where to engage in exploration for subsurface hydrocarbons.

Some geofactors are known or "visible" to artisans applying current technology and applied science, and may be quantified. Some geofactors, on the other hand, are "invisible," and beyond resolution using present methods and means known in the art. These invisible geofactors, therefore, compound the exploration problem (probably at an exponential or even a factorial rate), act and interact unpredictably, and are responsible for many, if not most, dry holes.

As is clear to practitioners in the art, between wells, and, therefore, in the subsurface areas where drilling investment is proposed, sequence property information in the form of physically-sampled evidence must be generated using a combination of interpolated available well data and data derived principally from seismic exploration. Well data allows measurement of many of the property parameters defined in FIG. 2.

To those familiar with the art, of course, seismic data allows good visibility of time information and acoustic impedance wave form data including amplitude, frequency and phase; it also provides fair information concerning velocity and density. But, unfortunately, seismic techniques historically have not provided an accurate route to conversion to spatial definition of sequence properties including lithology, porosity, etc. The seismic method presently allows the industrial working of material within a domain including location, time, velocity, depth, and acoustic impedance, in turn, including the wave form parameters, phase, frequency and amplitude. Historically, one "seismopetrophysically" defined set of properties, i.e., rock petrophysical property analysis using the seismic method, could equate to many lithologies such that porosity and other properties defined in FIG. 2 could not be accurately determined in areas of geologic complexity.

By the early 1980's, "normalization" procedures were in common industrial use to estimate normal burial change to seismic sequence sediment layer rock properties, as viewed through velocity behavior. See, for example, the following literature: Bulat et al., "Uplift determination from interval velocity studies, UK Southern N. Sea," Petroleum Geology of NW Europe, pp. 293–305, 1987; Wyllie et al., "Elastic Wave Velocities in Heterogeneous & Porous Media," Geophysics, vol. 21, #1, Jan. 1956, pp. 41–70; Gardner et al., "Formation Velocity & Density—The diagnostic basics for Stratigraphic Traps," Geophysics, vol. 39, #6, Dec. 1974; Brown, G., "Interval Velocity Studies in the Southern North Sea," GECO Exploration Services article; Feder, A. F., "Integrated interpretation for exploration," Oil & Gas Journal, May 5, 1986, pp. 180–187; Marsden, D., "I. Layer Cake Depth Conversion," Geophysics: The Leading Edge of Exploration, Jan. 1989, pp. 10–14; Ade et al., "F-Test, Isochron & Seismic Facies Analysis for Isopach Summation Depth Conversion," Singapore Seismic Stratigraphy Section, May 13, 1983; Carter, M. D., "II. Depth Conversion Using Normalized Interval Velocities," Geophysics; The Leading Edge, Jan. 1989, pp. 15–16.

By the mid 1980's, examination of prognosticated and actual drilling data revealed that abnormal burial history was the rule, not the exception, in prospective regions of many basins. Tectonic behavior variably in space and time, acts unpredictably to change in burial many physical properties including velocity, and also acts to disguise depositional properties. Tectonics acting to at least in part cause many traps also acts to disguise them. An inhomogeneous local pattern of stress and strain is associated with a presence of geofactors which may both influence deposition of rocks and influence the burial of rocks already deposited. These often complex influences on rock spatial occurrence and internal property act as an effective disguise to artisans and geoscientists working with prior art petroleum science and technology. As has been commonly reported in the international press in recent months, international oil and gas exploration is now conducted by private and state corporations who tend strongly to share similar technology.

All geofactors which are individually capable of causing geology as defined using seismic data, tend to be viewed as an "apparent geology". Apparent geology is that version of geology which is derived using the methods and means available within the evaluation process, and components of it are used in prognosis of prospects and traps. It may locally be different from real geology. The difference is commonly sufficient, over lateral distances per sequence of a k.m. or so, to significantly influence prospectivity, and apparent geology may subdivided into one of 3 groups:

[i] data resolution error, where perceived change is unreal, or real change is unperceived;

[ii] real depositional behavior; and

[iii] real burial changes to sequences.

In the prior art, various rock properties critical to exploration and production, i.e., time geometric data and the parameters listed in FIG. 1, were prognosticated spatially with an accuracy related to the correctness of that prognosis as proven in drilling. There are some indications that as much as 56% of current wells are dry through errors in prognosis or risk of such properties. This is demonstrated in

FIG. 3.

Improved interpretation of investment risk factors by those skilled in the art is precursed upon separate definition and analysis of these risk factors. The responsibility for analysis of such risk factors must be accepted by those who prepare and endorse evidence related to documentary requests for upstream expenditure. When a sufficient proportion of all relevant geological and geophysical factors can be adequately and separately defined, not only will risk be better understood and ultimately reduced, but also effective automation and computerization of the underlying complexities will be facilitated.

There has been a paucity of innovation in the prior art to enable a sufficiently comprehensive analysis of these geofactors to significantly reduce risk as herein described. But there has been a significant step taken by the instant inventor to better understand the velocities of acoustic energy in sedimentary rocks and for determining the causal effects thereof attributable to lithology and post depositional processes. More particularly, the methodology taught in U.S. Pat. No. 5,136,551 by the instant inventor and referred to hereinafter as "BECVEM" describes methods and means to improve analysis and definition of separate factors associated with the occurrence of dry holes, the disclosure of which is hereby incorporated herein by reference. BECVEM was developed to allow improved "normalization" to define and remove both normal burial effects common in a locally extensional environment, and anomalous effects caused by inversion, nonvertical compression, wrench tectonics, etc. Indeed, BECVEM has been tested by companies including Phillips Petroleum, Atlantic Richfield, Elf Aquitaine, Simon Petroleum, and PEP Ltd., of the University of Plymouth, U.K.

BECVEM's teachings allowed the testing of new, industrially useful methods and means to improve resolution from the seismic method, allowing interpretation and risk to incorporate spatial evidence of the action of each of several relevant geofactors indicated by seismic data collected at sites located between well control and in the vicinity of traps caused by localized tectonism.

BECVEM specifically augmented information locally relevant to hereinbefore defined apparent geology group [iii]. (Study sponsored by U.K. Dept. of Trade and Industry, O.S.O.; documented in Plymouth University Feasibility Study, June '93.) Thus, using BECVEM as a springboard, the present invention contributes to the prior art by enabling change in perception of apparent geology by changing perception of all three of these apparent geology groups, viz., [i], [ii], and [iii], and, insodoing, via performance of new industrial processes, engenders a new industrial "work domain" as will be hereinafter described in detail. (See FIG. 20)

To get better visibility of the subsurface requires not only that less ineffective work is performed, but also that more useful work is authorized. Accordingly, to constitute a significant improvement in the prior art requires a commensurate improvement of visibility, which, in turn, should reasonably be associated with a significant increase in useful industrial work load. As should be apparent to those skilled in the art, this requires innovative technology, since if effective methods and means already existed and were historically perceived as useful, such methods and means would now be industrially known and in use.

Because of the complexity of the causality for the panoply of geophysical properties defining the subsurface in a particular region or basin, those skilled in the art effectively utilizing the concepts embodied in BECVEM and disclosed herein typically will require ample training and the like. Thus, to effectively transfer such innovative and complex technology to industry requires computerization involving not only iterative interpretation of data collected via seismic testing and the like, but also requires integration with geophysical databases to properly validate and enhance knowledge for predicting suitable locations for hydrocarbon exploration and development. For such a contribution to the prior art to be an effective tool, it should provide a route to improved accuracy, allowing performance of the extra work necessary without extra costs and via use of existing industrial resource bases, overhead, staff, space, relevant material, and use of or integration with available industrial computer systems.

Such an advantageous route to translate within industrially acceptable levels of accuracy seismic geophysical parameters into geologically quality-controllable sequence petrophysics, i.e., physical classification of rock, has been heretofore unknown in the art. Indeed, as corroborated by such knowledgeable organizations as: Plymouth University, Devon U.K.; Marathon Exploration & Production U.K.; the U.K. Dept. of Trade and Industry (O.S.O.); the U.K. Petroleum Science & Technology Institute; Schlumberger Geoquest Systems, Inc.; Landmark Graphics Corp.; and Digicon Geophysical Corp.; no equivalent or comparable tools are either currently available or under research or development by those skilled in the art.

Accordingly, these limitations and disadvantages of the prior art are overcome with the present invention, and improved means and techniques are provided which are especially useful for reducing risks associated with geophysical prospecting and exploration by systematically and comprehensively evaluating and analyzing seismic sequence lithology and property under a novel work domain.

SUMMARY OF THE INVENTION

The present invention, conveniently referred to as "SPIRAL," an acronym for "Sequence Property Interpretation & Risk Analysis Link," enables a relative and significant reduction in dry hole risk, involving improved separation and definition and quality control of a panoply of relevant geofactors as hereinbefore defined (see FIG. 2). Thus, SPIRAL adapts currently applied geophysical technology in a manner heretofore unknown in the art, wherein embodiments of the present invention provide a new and synergistic route to improved material information of a plurality of sedimentary rock properties itemized in FIG. 2.

SPIRAL creates a new work domain to the extent that some several hundred % more parameters per data point in space are manipulated than is the norm. See FIG. 20. Using data organized in this work domain, the several separate factors associated with sequence property change are defined and quality-controlled within the component groups [i], [ii] and [iii] outlined hereinbefore. This allows such property data to be determined with improved accuracy.

Efficient application of the technology taught by the present invention may be accomplished by organizing each of its component steps to take place with minimal human intervention. As will be described in detail, material developed and held within the SPIRAL work domain may be effectively used to define, implementing an automated and computerized system, sequence lithology, and also its present and local capability to act as a reservoir, seal, migration route, source or stratigraphic or structural trap of economic interest. Furthermore, by enabling such hereinbefore unknown definition and elaboration of evidence, the present invention facilitates estimating prospect and field reserves in place or recoverable reserves, and estimates the risk that components prognosticated as present may not be so present. SPIRAL's route to accuracy and effectiveness through computerization and automation is summarized in FIG. 1.

In accordance with the present invention, a comprehensive methodology is provided for significantly improving the productivity of hydrocarbon exploration. In a preferred embodiment of the present invention, as will be described in detail, SPIRAL's logical steps and stages have been incorporated into a collection of computer programs, which provides artisans with a surprisingly effective exploration tool.

The present invention translates seismic time data, via seismic depth data, to seismic depth/lithology data, from which economic location and development of hydrocarbons may be planned. Material data is constrained to be geologically possible, then further constrained to be consistent with probability, via quantification of burial history, depositional facies distribution, and data resolution. An initial ensemble of preferred user variable defaults is invoked.

As will become clear to those skilled in the art, seismic time data, to have a maximized economic value, needs to illuminate or make visible material defining the presence of seismic sequences which are definable layers of generically related material. Therefore, automation of time interpretation requires, as a prerequisite, an ability to define those sequences which are present, by property characteristics, before such sequence boundaries are spatially interpreted.

Of course, lateral picking of known boundaries from and between known control points can, to an extent which may be variable but nevertheless useful, presently be performed using automated processes now commercially available. For instance, the exploration geoscience interpretation workstation market is dominated by Landmark Graphics and Schlumberger Geoquest Services. Several seismic data acquisition and processing companies share a different market, and have a potential to transfer data interpretation processing towards or into the seismic data processing domain.

Notwithstanding, there are several elements missing from such currently available tools which prevent even an attempt at exploration and prospecting prognostication as contemplated by the present invention. First, a missing industrial element supplied by SPIRAL is related to acquisition of material within the seismic method sufficient to improve definition at control points those sequences appropriate for the interpretation process to continue. That is, seismic depth data, to have a maximal economic value, needs to combine valid material defining seismic time sequence boundaries with valid sequence property, e.g., velocity, material, etc., to allow valid depth conversion and spatial estimation of migrated position.

Second, a missing industrial element supplied by SPIRAL is related to acquisition of material within the seismic method and quality-controlled with well data if required, sufficient to improve definition per sequence of lithology and its spatial variation in terms of relevant property. That is, seismic depth lithology data, to have a maximal economic value, needs to represent, per sequence, valid information defining both depositional lithology and its current properties as altered during post depositional history.

Third, a missing industrial element supplied by SPIRAL is related to acquisition of material within the seismic method and quality-controlled with well data if required, sufficient to improve definition per sequence, spatial presence and properties and economic potential of reservoirs, of source sediments, of seal sequences and of traps. Seismic depth data, defining prospects of potential economic interest as closed, sealed, and sourced reservoir, to have a maximal economic value, needs to represent per sequence valid information defining the degree of presence of each element of risk possibly relating to that data.

Fourth, a missing industrial element supplied by SPIRAL is related to acquisition of material within the seismic method and quality-controlled with well data if required, sufficient to improve definition per sequence of risk concerning prospects and the accuracy of such interpretation.

As hereinbefore articulated, the disclosure herein invokes and incorporates by reference the terminology and classifications set out in the same inventor's disclosure in the BECVEM U.S. Patent.

The present invention, to reduce the significant risks associated with conventional hydrocarbon exploration, addresses seismic sequence property resolution presently being an approximation with an unknown component of resolution error, of depositional properties and post depositional change. To identify and mitigate the plethora of unknown and invisible geofactors, the "apparent" nature of such properties and factors must be broken down into all of their significant component parts, and then each component part must be quality-controlled. Ultimately, all of the component parts are summed and quality-controlled.

Thus, in accordance with the present invention, the steps comprising SPIRAL may be summarized thusly:

1. Time and "Apparent" Velocity
2. Normalized Depth and SPIRAL Interpretation: Resolution; "Apparent Lithology"; Burial Deposition
3. SPIRAL Lithology: Definition of reservoir volumes, etc.
4. SPIRAL Reserve & Risk Determination As will become clear to those skilled in the art, SPIRAL's improved means and methodology provides a unique work domain wherein new scientific and industrial technological processes may be used for hydrocarbon exploration and prospecting, with reduced risk of realizing only dry holes.

It is an object of the present invention to provide a new work domain for hydrocarbon exploration which provides a several-fold increase in information per data point in geophysical space.

It is another object of the present invention to provide a new work domain involving improved separation and definition and quality control of a panoply of geofactors accurately describing the location of hydrocarbons beneath the surface.

It is still another object of the present invention to provide a method for accurately distinguishing between apparent and real depositional behavior, burial changes to seismic sequences and data resolution error. It is an advantage and feature of the present invention that material data provided by its work domain is quality-controlled to be geologically possible, then further quality-controlled to be consistent with probability via quantifying burial history, depositional facies distribution and data resolution.

It is an object of the present invention to provide a computerized methodology for automating hydrocarbon prospecting and exploration using prevalent computer technology and the like whereby those skilled in the art may better understand the lithology of subsurface formations and, consequently, reliably predict the deposits contained therein.

It is an object and feature of the present invention that a method is provided to enable the mapping of the contours of a particular area notwithstanding the myriad interrelationships among the several post depositional factors thereof. Indeed, the prior art's ability to adequately map such complex areas has been handicapped by a lack of understanding of the consequences of these various phenomena upon lithology and velocity distribution. Considering only seven of these several factors (7!=5040) which commonly combine to render accurate mapping impracticable, produce more than five thousand possibilities.

It is also an object and feature of the present invention that a method is provided to enable those skilled in the art to reduce the risk of obtaining dry holes.

It is an object of the present invention to enrich the prior art with an industry standard promoting efficient and accurate communication on technical geophysical matters between parties.

It is another object of the present invention to provide those skilled in the art with improved hydrocarbon exploration techniques and methods which may be ported to virtually any basin throughout the world.

It is another object of the present invention to provide for accuracy and reproducibility in Unitization and Equity work whereby hydrocarbon resources may be equitably apportioned among the parties without extensive debate.

It is another object of the present invention to provide a computerized, data-based, paperless, automated means and method for performing geophysical prospecting.

It is another object of the present invention to allow location of hydrocarbon accumulations which are currently invisible to the art.

It is another object of the present invention to provide a computerized, data-based, paperless, automated means and method for performing geophysical prospecting according to standardized company practices and procedures.

It is another object of the present invention to provide a computerized automated system for definition of velocities of acoustic energy of sedimentary rocks which can be readily integrated with existing computer system designed for interactive interpretation of prospecting data.

It is another object of the present invention to provide a means and method to reduce the number of wells prerequisite to locating and producing hydrocarbons in an area.

It is another object of the present invention to provide a means and method for increasing reservoir and overburden knowledge with respect to mitigating drilling hazards due to porosity distribution and the like.

These and other objects and features of the present invention will become apparent from the following detailed description, wherein reference is made to the figures in the accompanying drawings.

IN THE DRAWINGS

FIG. 2 is a table enumerating the parameters for definition within "upstream" geoscience evaluation in accordance with the present invention.

FIG. 3 is a pie chart depicting causes of cost waste, dry holes.

Figure 4I:
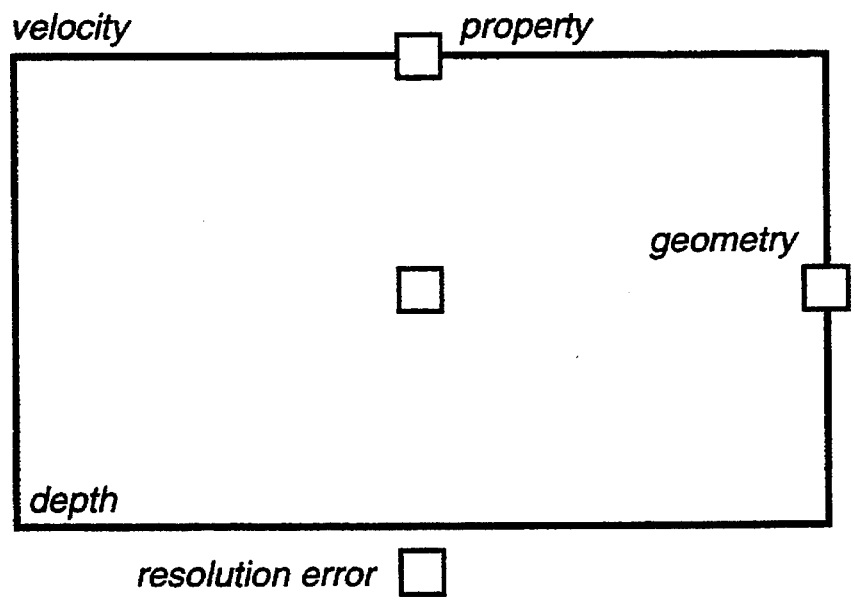
FIG. 4i is a plot of velocity-depth domain depicting seismic property and error margins.
Figure 4I:
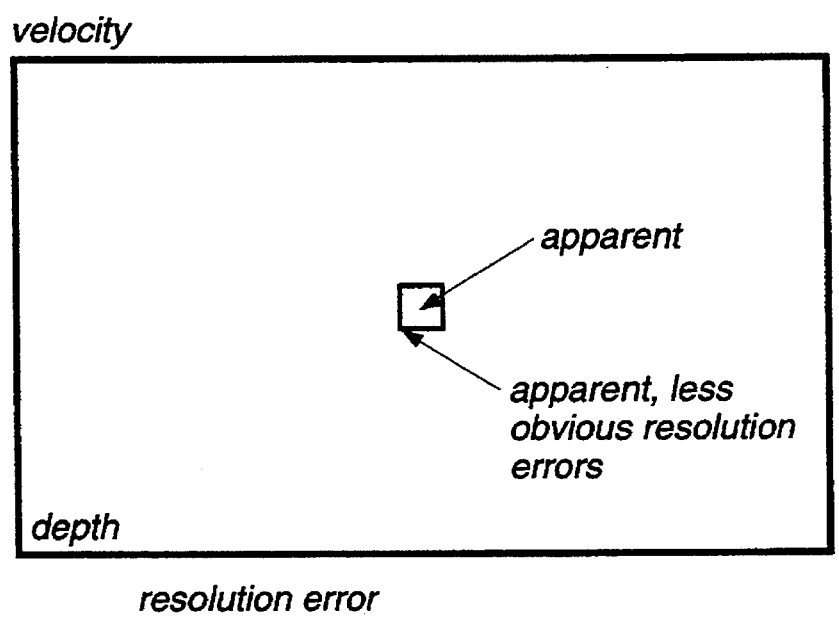

FIG. 4ii is a plot of velocity-depth domain depicting "apparent value" from FIG. 4i.

Figure 5:
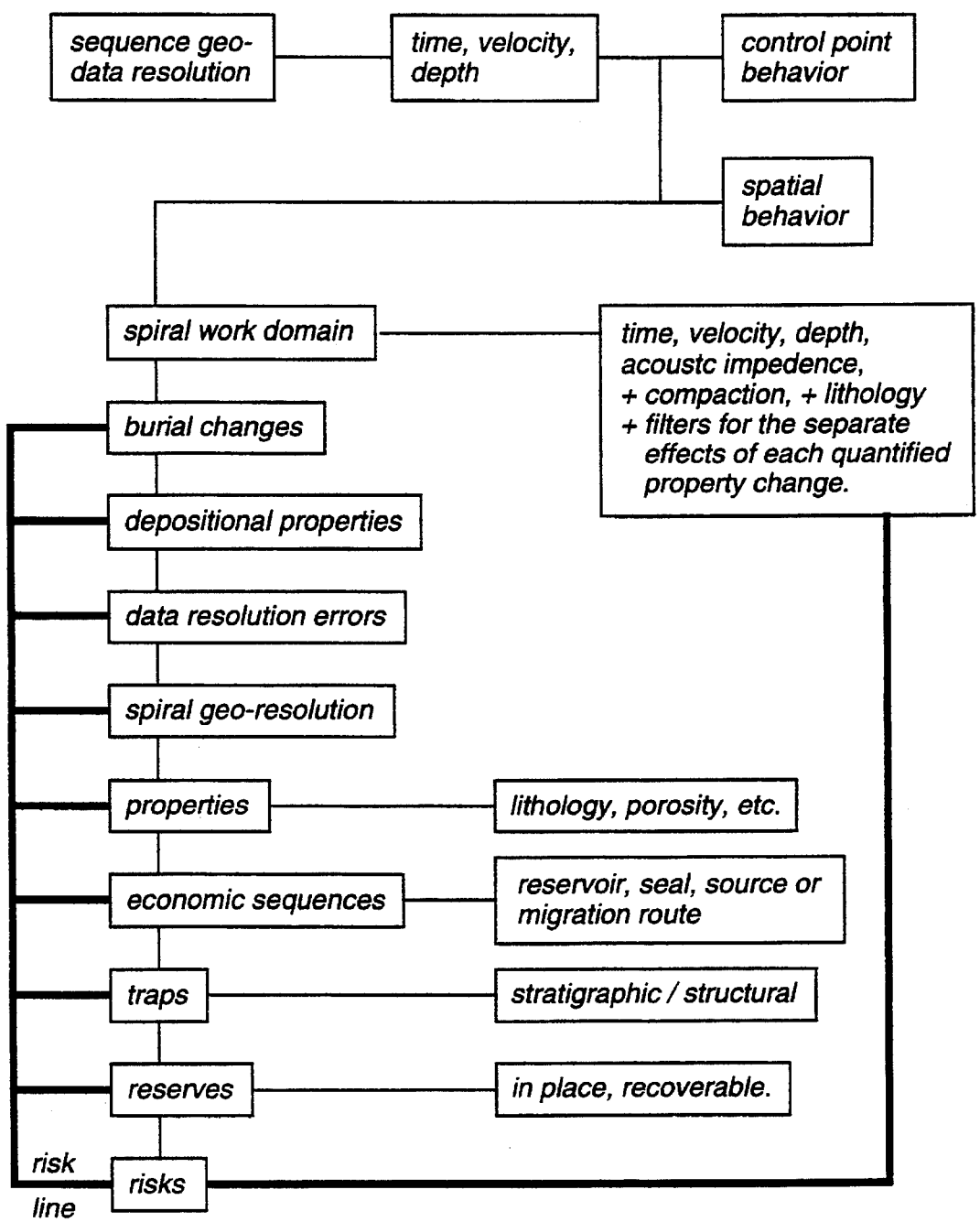

FIG. 5 depicts a detailed work flow diagram embodying the present invention.

Figure 6:
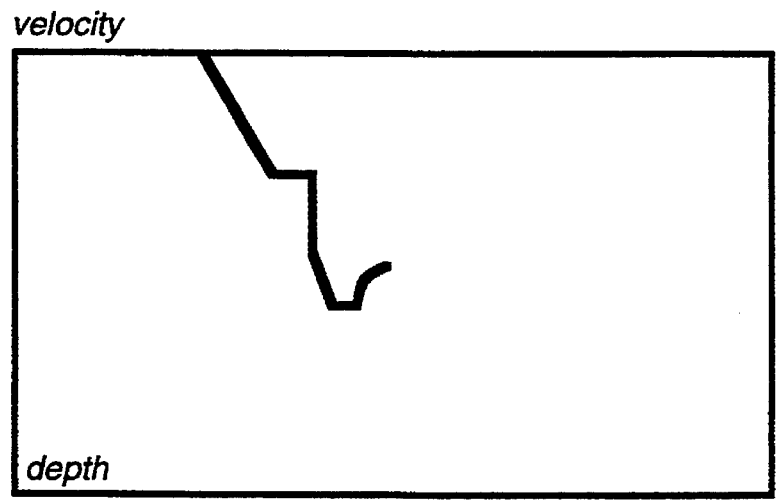

FIG. 6 is a velocity-depth plot schematically depicting work domain, sequence property behaviour track, per shot or grid point, embodying the present invention.

FIG. 7 is a velocity-depth plot schematically depicting work domain, behaviour, velocity/depth/lithology/compaction, embodying the present invention.

FIG. 8 is a velocity-depth plot depicting compaction rates.

FIG. 9 is a series of velocity-depth plots depicting post depositional anomalies, schematically showing effect on work domain, per sequence.

Figure 10:
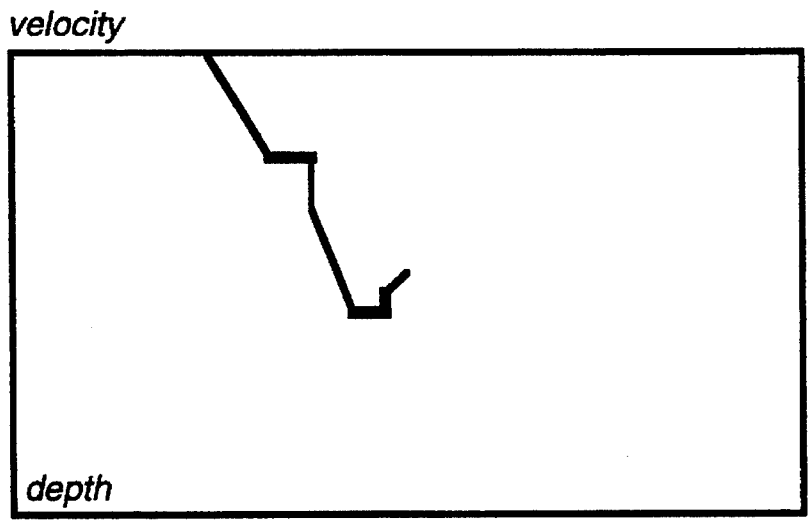

FIG. 10 is a velocity-depth plot depicting post depositional anomalies, schematically showing effect on domain, per shot or grid point.

Figure 11:
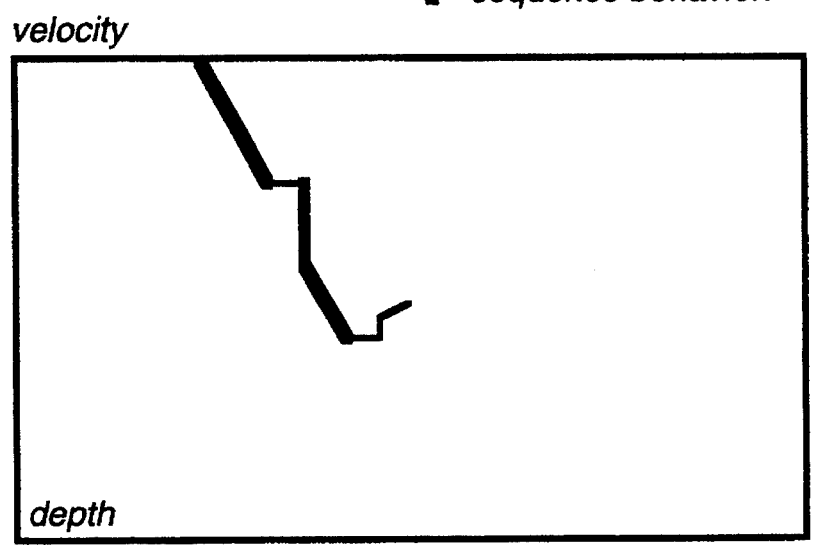

FIG. 11 is a velocity-depth plot depicting normal burial, schematically showing effect on domain, per shot or grid point.

Figure 12:
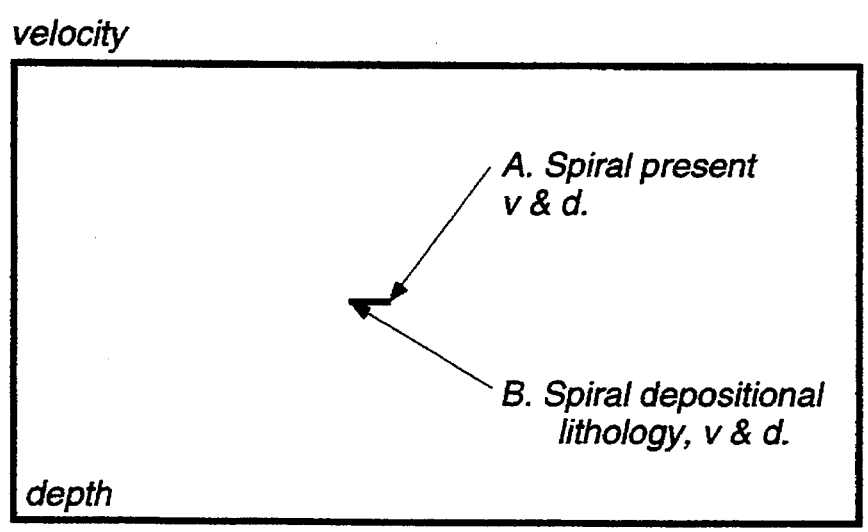

FIG. 12 is a velocity-depth plot depicting present domain behaviour and depositional lithology type.

Figure 13:
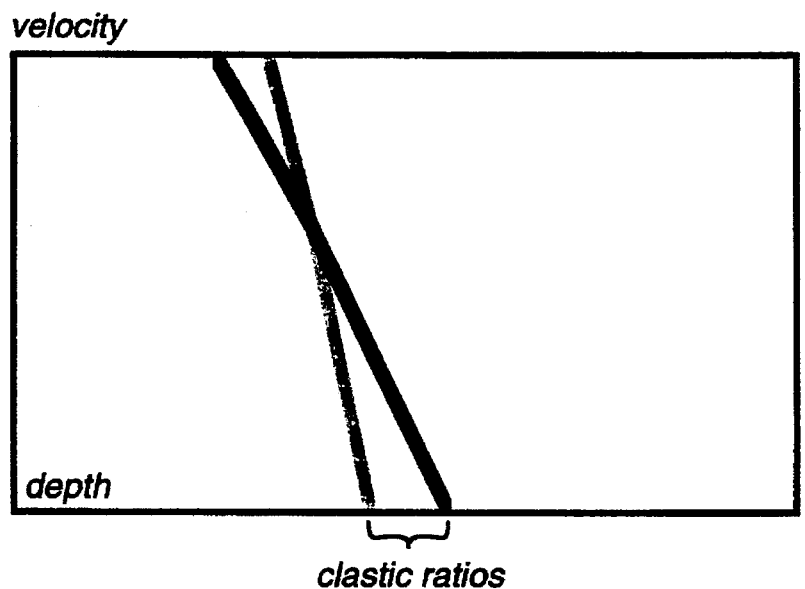

FIG. 13 is a velocity-depth plot depicting work domain view of sequence clastic ratios.

Figure 14:
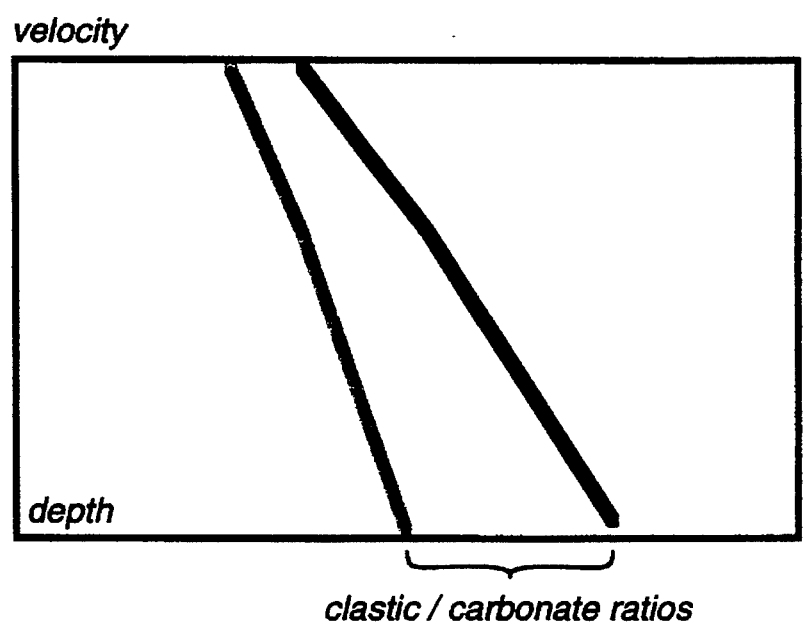

FIG. 14 is a velocity-depth plot depicting work domain view of sequence clastic/carbonate ratios.

Figure 15:
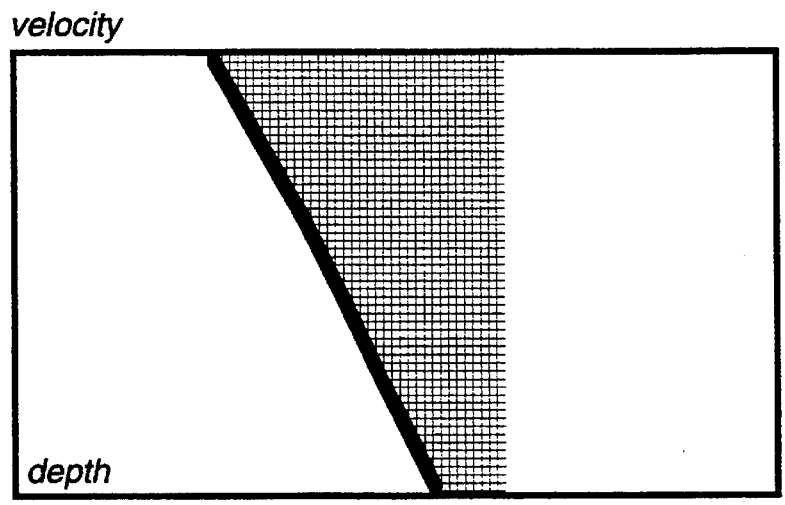

FIG. 15 is a velocity-depth plot depicting work domain view for sandstones, accessing property data base from grid, knowing deposition and present domain properties.

Figure 16:
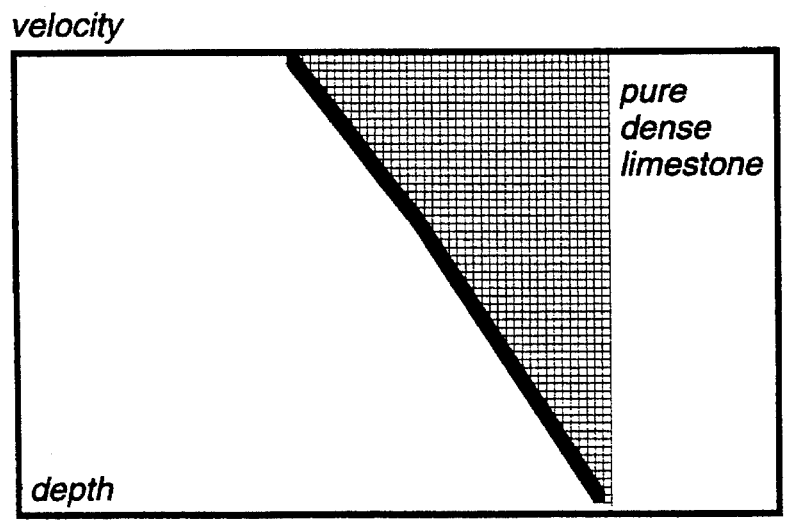

FIG. 16 is a velocity-depth plot depicting work domain view for chalk/carbonates, similar to the plot depicted in FIG. 15.

FIG. 17 is a table enumerating risk assembly factors.

Figure 18:
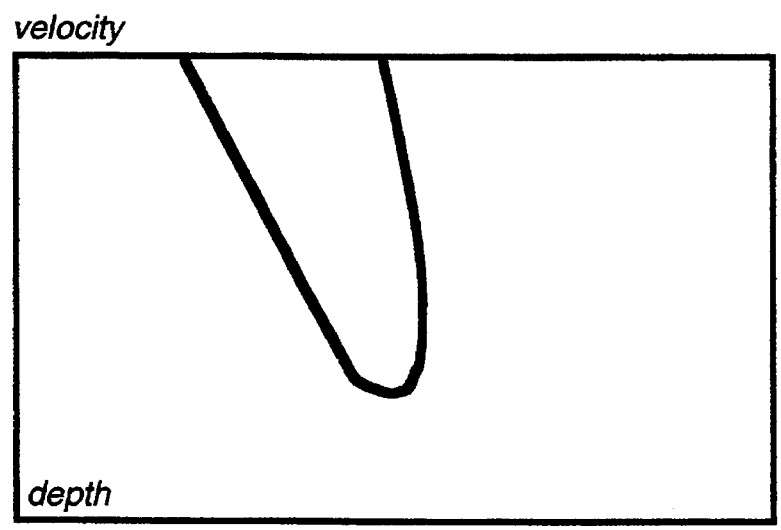

FIG. 18 is a velocity-depth plot depicting sequence zone of uncertainty.

FIG. 19 is a table of lithologies depicting conversion grid construction.

Figure 20:
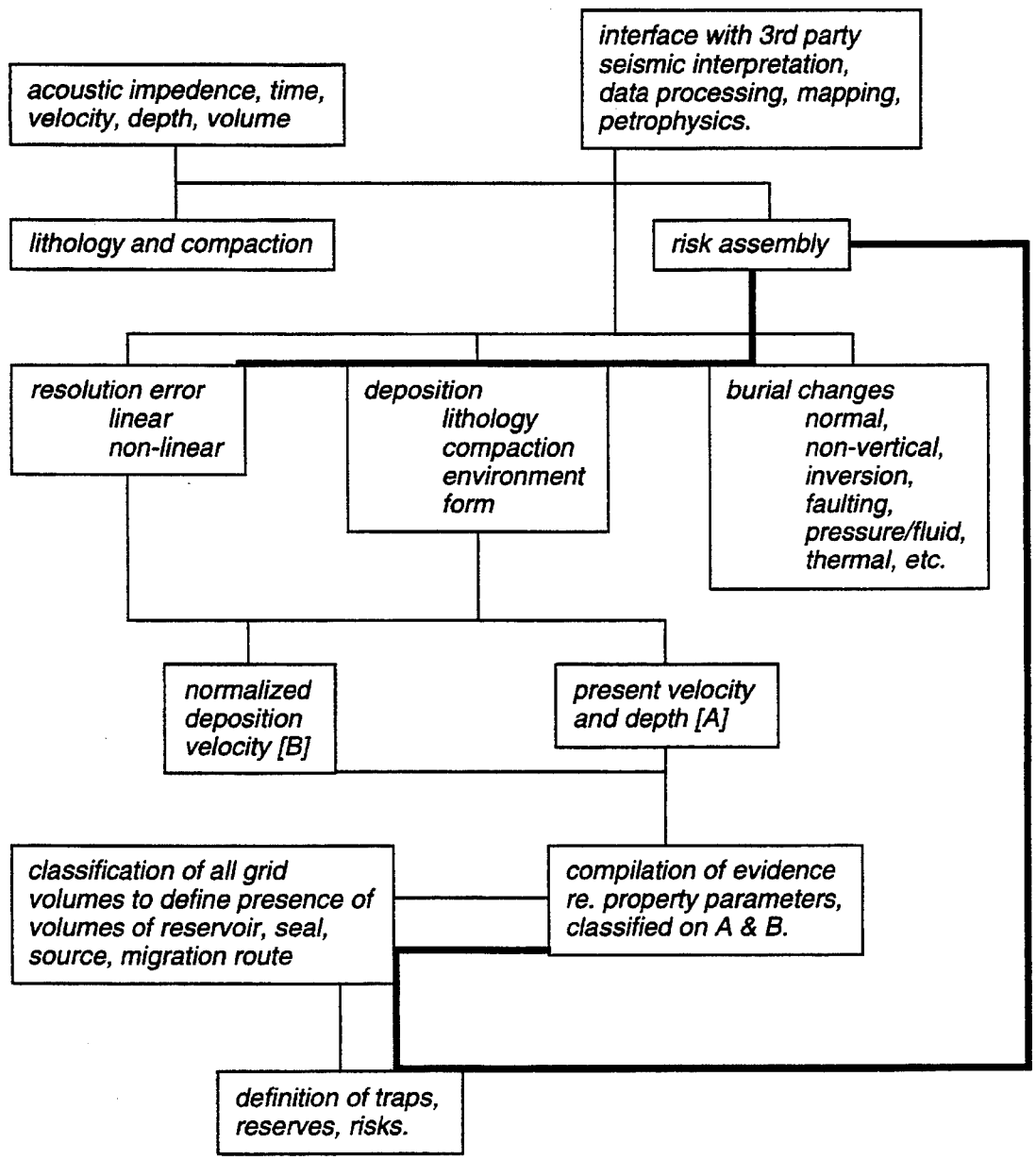

FIG. 20 depicts SPIRAL work domain embodying the present invention.

DETAILED DESCRIPTION

Part 1. Seismic Time Data

Figure 1:
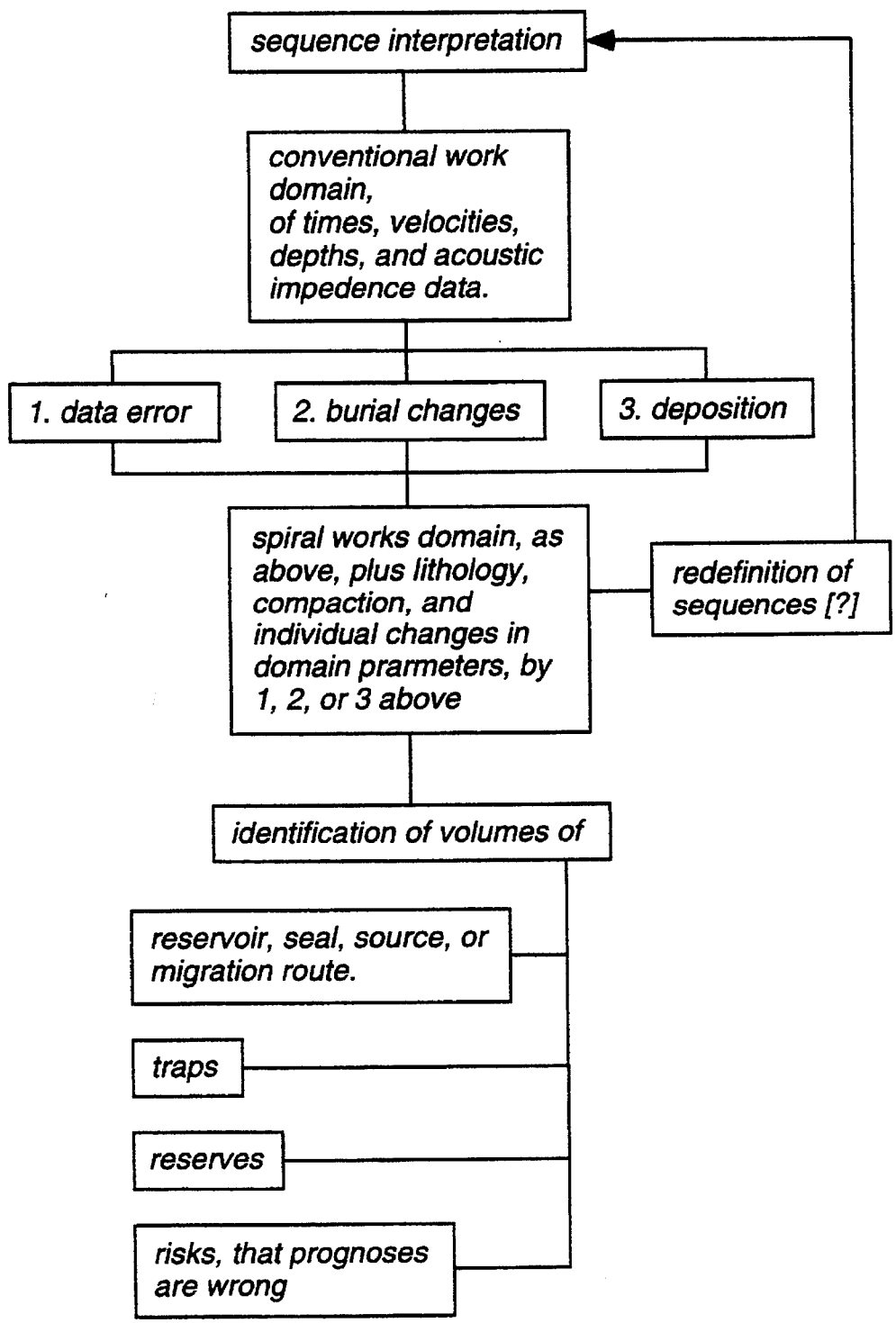
FIG. 1 depicts a work flow summary embodying the present invention.

FIGS. 1, 5 and 20 depict a representation of the methodology embodying the present invention. The detailed description herein will be presented in five stages identified by the Stages "A" through "E" inclusive. Thus, these five stages may be tabulated as follows:

| Stage | | | |
|---|---|---|---|
| | A. | Initial Processing | EE |
| | B. | Plan for Migration | EE |
| | C. | Sequence Boundary Ties | EE/SS |
| | D. | Sequence Time Boundary Interpretation | EE |
| | E. | Sequence Normalized 'Apparent' Velocity Interpretation | EE/SS |

As illustrated in this tabulation, throughout the disclosure herein will be included shorthand abbreviations SS, BB, and EE. SS represents certain aspects of the present invention which contribute to the prior art. BB represents certain aspects of BECVEM which have contributed to the prior art. EE represents certain knowledge, techniques, and methodology existing in the prior art.

Associated with the discussion of the work domain taught by the present invention is a preferred series of default values for the various factors and the like comprising the preferred embodiment. Such a series of defaults enable a user to effectively cope with a large collection of geofactors, and to override default values individually. In a particular context wherein one or more such values are being discussed, either a specific default is specified or a reference to the SPIRAL defaults generally is made.

All Sequences appropriate to the instant geophysical task need to be interpreted in respect of time boundaries. This requires that all significant volumes of sediment which are physically significantly different from bounding volumes be spatially identified in seismic time. Therefore, a preliminary analysis of properties needs to be associated with time interpretation. Data processing precedes this step and includes an analysis of property as visualized through velocity. Seismic data cannot be effectively processed without a spatial knowledge of velocity which is accurate on average to an extent of about +/-10%. SPIRAL uses this general information, and refines it through several iterations.

In many circumstances, valid time boundary information will exist, covering all sequences known to be relevant to interpretation of an area of interest. Error significant enough to have a causal association with dry hole occurs in approximately 25% of such interpretations. It is assumed that many potential industrial users will plan to apply such time boundary interpretations and then to use SPIRAL and other methods and means to define relevant sequence property and prospectivity information. In such circumstances, it is unnecessary to construct computer systems to promote automatic selection of seismic sequences at points of control, or to promote automatic selection of pick sequence boundaries between those points of control.

Stage A. Initial Processing 1. i] Load velocity root mean square / time data pairs, derived in conventional seismic data processing, and known to and used by artisans in the art, e.g. at velocity spectra points, per k.m. Alternatively, use special processing displays of seismic cross section/interval velocities. Load location data. For convenience, velocity root mean square will be hereinafter abbreviated as "v.r.m.s."; similarly, velocity spectra points will be hereinafter abbreviated as "VStudy" points.

ii] Load time seismic record trace data display, per conventional workstation time sequence interpretation, including location information.

iii] Load well control as available, per conventional workstation interpretation action. Use seismic datummed, i.e., material evidence converted to be related to a common surface, usually mean sea level, true vertical depth, sequence tops, times, depths. Sonic inverted to choice of feet/sec or meters/sec, prepared as for synthetic generation, per BECVEM.

2. At VStudy control (see ii hereinabove), calculate interval velocity per sequence, if time boundary data has been interpreted; otherwise, calculate such interval velocity per time/v.r.m.s. pair chosen in processing. For convenience, interval velocity will be hereinafter abbreviated as "VI."

Define VI gradients between VStudy points of control, per sequence, preserving the negative and positive, which exceeds specified defaults. For example, around 10%/k., where each time thickness equals or is greater than a default time thickness of around 2 wave form cycles, and where dip, measured for example using dip move out processing, exceeds a default of about 10 degrees.

Where sequences necessary for interpretation have not been defined or where the user wishes to further confirm the validity of a pre-existing choice of sequences, use VStudy time /v.r.m.s. pairs, as used in processing, or as repicked by the user. Then, calculate VI and thickness per interval, and identify all vertical gradients which exceed a user defined default, e.g., 10% VI change per unit area user given. Identify locations where vertical thickness does not exceed default given above and dips are less than default.

Define dip in any zones where dips are seen to exceed a default of about 10 degrees.

3. Seismic sequence definition [A.A.P.G. Memoir 26], via VStudies from seismic processing. Conventionally, the time geometry of seismic sequences are defined using well data supported by seismic stratigraphy, where automation of identification of seismic sequences is required. Concerning seismic data, research interface of reflections of different dip trend, indicating possible presence of an unconformity, truncation, on-lap, offlap. Concerning well data, research, well sonic, edited, runs joined, datummed, prepared per synthetic generation, and inverted to linear feet/sec, or meters/sec., and as is described in BECVEM. Process sonic to output apparent sequence changes, using parameter changes as hereinbefore defined.

4. Load from data defined in 2 above, VStudy common depth point times and associated vertical VI variation across interval boundaries defined in data processing into a workstation with some auto picking capability of reflection acoustic impedance waveform.

i] Add or calculate definition of zones of low dip as discussed hereinbefore. User preferably defines a zone by nominating it as an area size of choice, e.g., about 10 k.m. square. It is then necessary to define, per zone, that VStudy point which is associated with the lowest average dip, per total record length, down to a default maximum time of some 3.5 seconds. Sample the total record length at predefined time intervals, user default some 0.5 seconds. (Note that times are in two way times.)

ii] Per Zone, select a group of Vstudy points, preferably a user default of approximately 16, closest to that common depth point. Per Vstudy point, assess VI from each time/ v.r.m.s. pair, i.e., not yet related to seismic sequences.

iii] Then identify a zone "seed" VStudy point control, by calculating per Vstudy point, the average of a +or - VI change, noting number of intervals, and choosing the seed as representative of the average in terms of number of intervals, and average magnitude of VI change for those intervals. It may be appropriate to auto search for local evidence of diffraction energy, or other energy which does not represent the sequence in the location defined.

iv] Starting with the Vstudy point chosen as seed point within the zone showing lowest average dip, order the VI boundaries. Define Boundary 1 as that showing the greatest % vertical change, and then define the next boundaries in reducing order of magnitude. The number of boundaries should be set by user, preferably with a default of approximately 20 boundaries. Seismic sequence geophysical interpretations commonly average mapping of approximately 8 to 12 sequence boundaries, so the default should preferably be set to a number above what may be expected in a basin and the like.

In accordance with the present invention, to identify the top of the first sequence to be spatially defined requires that correlation be made to define as well as possible the lateral extent and behavior of each seed point defined boundary. Per seed point, create a time/VI plot showing the (default hereinbefore suggested, 20), time/velocity defined intervals. Per Vstudy points adjacent the seed point (default hereinbefore suggested, 16), create time/VI plots as hereinbefore described.

Starting with boundary one, at seed point, correlate laterally to adjacent points using time value, and search up and down a user given time gate, (recommend default 100 milliseconds) for a similar VI change, with a similar sign negative or positive, and similar time thickness. Define degree of fit. If a correlation is successful, average the VI% change, and store with deviation. Define group average of time thickness and VI and store.

To identify and define the base of the first sequence, review for the group the next VI change noted below in time the previous VI/time pair. Average the group's VI% change, ignoring +/−, and user defining acceptable level of lateral variation within this sequence 1 basal group (default, around 10% per k.m.). Average the group's time thickness.

To identify and define the top, and the base of the next sequence, proceed as hereinbefore described, taking those time/VI pairs which remains and using that one at seed control point with the largest VI% change. Continue until a required number of sequences are defined per zone. Adjust defaults and reiterate as necessary to arrive at a definition of user required number of sequences. (A reasonable number may be around 15, as default).

Alternatively, generate velocities VI, at a closer interval and plot preferably three-dimensionally, adding dip data, and autopick best fit of user defined number of sequences. The criteria of definition in this approach should preferably include both interval velocities and dip, and preferably seismic acoustic impedence data. As an example, one skilled in the art might use a three-dimensional modification of Digicon's 2D "Velscan" processing of the 1974.

In accordance with the present invention, this generates an estimation of sequence presence in zones of simple overburden ray path, which may be used in conjunction with seismic stratigraphy and well control to help define sequences.

5. Per "seed" area, using layer cake methods known to artisans, see, e.g., BECVEM and Marsden "Layer Cake Depth Conversion" published in Geophysics, Jan. 1989, pp. 10–14), and the sequences developed and their concomitant time thicknesses and VI data, create linear velocity/depth plots. Calculate sequence midpoint, top and base in depth and plot a line through these points using VI on the other axis. Preferably, the default vertical axis is depth and the default horizontal axis is VI. This makes a "pseudo-inverted" sonic representation, per sequence, per seed area. Where well control exists within this zone or adjacent distance, using similar scales to those used in conventional well sonic analysis (Note a user default distance of 15 k.m.) and overplot on seismic derived pseudo plot. Define fit in terms of match between wells and seismic using the number of sequences, their thicknesses, VI, and dip direction and amount if known. Define if acceptable as a fit. Store parameters. Iterate and/or user define acceptance until parameters of choice are tuned.

It should be clearly understood that this Stage A processing herein described in detail corresponds to one route to prepare material for use in subsequent stages and steps of the present invention. As should be clear to those skilled in the art, there are several alternative routes to accomplish similar data preparation and validation purposes.

Stage B. Plan for Migrating 2-dimensional and 3-dimensional 'stack' data, and 3-dimensional "migrated" program data, per similar program of recording and processing, should tie (time match record wave form) in dip, strike and intermediate line intersecting directions of orientation. As is known to those skilled in the art, this data set is thus likely to be more easily correlatable by machine at ties than if other data is used. 2-dimensional migrated data may variably mis-tie at line intersections, depending on overburden dip and direction.

All data may variably mis-tie between surveys of different recording and/or processing, to an extent which can now be auto-defined by current technology. 2-dimensional data can now be auto correlated between stack and migration versions of the same line data set. This difference was created by a data processing step and thus may be readily removed by another data processing step. Existing methods and means used for the purpose of 3-dimensional depth migration may be used to help define a velocity field most valid for that purpose. It is suggested that until workstations can comfortably reduce and define migration mis-ties intrinsic in 2-dimensional data of different surveys or processing, that computer systems embodying SPIRAL technology use 2-dimensional stack and 3-dimensional migrated data as preferred data, converting to 2-dimensional migrated data as necessary to improve pick or line related auto pick. This allows 3-dimensional map or grid migration of 2-dimensional data to occur by conventional and established methods, a selection of which are likely to already exist in available workstations and the like.

Stage C. Sequence Boundary Ties

Under the present invention, prior to interpreting seismic sequence time boundaries within pre-defined zones, and then between such zones, control data defining such sequence boundaries need to be ordered and weighted. Well data should be preferably accorded high credibility, and, thus, SPIRAL's defaults should benefit from suitably high-weighted well data. Seismic control, in zones of low dip where boundaries are defined on both angular discordance and Vstudy points/VI evidence, weigh medium, and in the absence of corroborative evidence from Vstudy points, weigh lower. Well Control, is likely to mis-tie 2-dimensional stack 2-dimensional migrated data and 3-dimensional depth migrated data; ties may be achieved using current methods and means known to artisans. Ties, in this context, correspond to a match between seismic wave forms. In this case, ties concern intersecting lines such that the wave form is caused by a specific, local, unique geological change in property, e.g., velocity or density.

Seismic VStudy points establishing time sequence boundary control, may need to be adjusted to represent the point within each wave cycle which is used in the time boundary interpretation process. A preferable default of SPIRAL is the onset of peak below nearest trough for normal polarity data. Reflected seismic energy occurs at the interface of two rock layers of different acoustic impedance contrast, i.e, velocity, density contrast. If the seismic data passes from a low velocity layer to a fast velocity layer, it generates a "trough" signal, and if it passes from a fast velocity layer to a slow velocity layer, it generates a "peak" signal. That is, under such circumstances, wave polarity changes. Accordingly, it is advantageous to correlate between ties, using depth cross sections without using seismic trace data. Quality control by examining % change per k.m., per parameter of VI , thickness, depth. Adjust control point data as weighted to effect ties. User define acceptable gradients of behavior. When an acceptable correlation is made between control as above, add the minimum number of seismic lines necessary to effect ties to control data zones. In accordance with the preferred embodiment, a user default is to tie to within 250 meters. Then, repick all Vstudy points, v.r.m.s. data to new VI values, using the new sequence time data, per zone used, having correlated seismic time sequence boundary to all zone Vstudy points. Quality control behavior, particularly in respect of VI change per k.m.

Stage D. Sequence time boundary interpretation

Use current technology which works for 3-dimensional and adapt for 2-dimensional stack data, to track multiple seismic sequence boundaries for true amplitude or surface attribute mapping. Starting points are preferably well control and seismic VStudy "seed" points of control. Reiterate to allow reinterpretation if routines either cannot tie without exceeding default in mis-tie cycles, or if ties in loops are achieved, but parameter change/k.m. exceeds default used. In each case, modify (user default, e.g., increase by 10%) one parameter of default per iteration to achieve loop tie. This procedural maneuver principally concerns technology, associated with pattern recognition capability, already available within the prior art, e.g., from either of two principal suppliers, viz., Landmark or Geoquest. Edit manually as required to view interpretation status or to change parameters.

For all areas of low overburden dip, a seed point of control exists. Elsewhere, every k.m. or so, a VStudy control point exists, allowing tracking to occur. This allows visibility to occur an any of these data control points, indicating how tracking has proceeded from the nearest point of well control or seed control. Seed control may include points of clear evidence, where sequence boundaries are defined by well data or are visible to the seismic interpreter or interpretation machine, concerning unconformities visible using pattern and character analysis, or the analysis of velocities described hereinbefore (see 4[i]). Tracking should preferably include an update and restoration, per VStudy point of time, and velocity data, to fit this tracking within the (user default 1 cycle) control, before tracking continues to the next VStudy point, and on to the next point of well or seed control.

Breakdown may occur between seismic waveform trace data interpretation and that made as controlled with information from VStudy points. In this case, according to the present invention, allow the former to optimally tie to the nearest seed control, and then reiterate apparent sequence derived VI data at intervening VStudy points. If the new solution is outside the velocity default given, flag the VStudy points causing the stop and define it as unusable, until user re-entered or modified. In such cases where observed sequence velocity change exceeds a gradient which is user defined as possible, then such information is relevant within later processes aimed at spatial quantification of risk.

Retain and store all original v.r.m.s., time, VI and sequence time data, so that quality control may occur against change in iterations of interpretation from well data, through seed points, to other VStudy points. As will be appreciated by those skilled in the art, the geological possibility of defining behavior of importance exists in zones outside seed zones, so such data must not be oversmoothed. Hence, remove only that which is geophysically impossible by setting suitable defaults.

Zones of weak or zero lateral correlation should preferably terminate tracking, and define no-go areas, flagged for user editing, and noted for later risk analysis. Fault zones, etc., may cause no-go areas. Auto match, using both waveform and seismic derived VStudy pseudo sonic points, matching each to their equivalent across each border of the no-go area, to define best overall match.

According to the present invention, quality control stages preferably consist of the following steps. Tie cross sections, tie grid between seed control, and map. Highlight data points where the gradient indicated from time thickness is less than 2 wave cycles, or the default given, or where the VI change exceeds 10%/k.m. or the default given. Control by suspension of one or more VStudy control points, or modification of such points to absorb local ultra thin areas of sequences into the bounding sequence with closest VI properties.

Stage E. Sequence Normalized "Apparent" Velocity Interpretation

The present invention enables those skilled in the art to improve interpretation and risk by adding and validating data which today is considered to be severely underused. At this stage, those skilled in the art may use SPIRAL to add existing time sequence interpretations, where sequence definition has been achieved by other methods, together with well and seismic-derived velocity information. Sequence "apparent" normalized velocity interpretation is therefore comparable with effective normal practices, but different in that it uses data organized differently, such that the later stages of SPIRAL may function.

1. Section D hereinbefore described may have caused editing of sequence boundaries in time from those originally defined in sections thereabove. Re-relate the most current time picked sequence boundary information to well control and to VStudy point control. Convert to sequence VI data. Confirm that behavior and spatial change conforms to default parameters established. If not, add or delete time or velocity data. Suggested default. If three or more VStudy control points indicate that two or more cycles of a unit of waveform are associated with velocity information which shows a 10% or greater variation from bounding sequences, and if this VI change interface can be correlated between the VStudy points in time data, then this (new) unit should be defined as a new localized seismic sequence, and added to the time interpretation.

2. At this stage may be generated apparent seismic sequence VI values at discrete points. They have not been smoothed, but have been controlled to omit data regarded as geophysically impossible, via use of user defined defaults. The data therefore may contain resolution errors, in addition to property variations associated with deposition, and/or burial. Furthermore, at this stage, grids should preferably be generated to confirm that the velocity and the thickness behavior conforms to, and does not exceed, the default limits. Since sediment properties and velocity in particular vary greatly in linear terms, it is suggested that such variation is also measured in % terms.

Honor wells at 100% and seismic derived data as closely as possible, within the defaults set by users. The accepted gridded data may impose values on the seismic VStudy data points which are different from the values of origin. Therefore, both the original and the modified data need to be stored, such that zones of weaker data may be identified. Space for several other changes should preferably be available within the work domain as shown in FIG. 20, per sequence shot point or sequence grid point, for other processing as will be described in detail.

3. Perform layer cake depth conversion, using sequence time and the "apparent" VI data to achieve a first pass depth conversion. Map sequence thicknesses, and examine well control to define repeated or missing section, using methods and means known to experts in the art. For example, if a thickness map indicates that a well shows significant variation when compared with adjacent seismic data, check the well in case of missing section or repeated section, each possibly caused by faulting.

4. "Apparent" Compaction behavior (see FIG. 6).

a] Using VI data from the accepted gridded values, create (default, linear) relationships of velocity and depth, per sequence, as hereinbefore described. For example, VI approximates to a straight line over the depth range present.

b] Overplot lithologies, for example, from Gardner's work (see BECVEM and FIG. 7) to show lithology of the several principle sediment families as defined in conditions of normal, extensional burial. Per well, per sequence inverted sonic, perform regression analysis to compute rate of average change of velocity with depth. Define anomalous behavior as differences at wells in gradient between published normal "pure" behavior, and that seen, per lithology type. (See part 2, Seismic Depth Data, hereinafter).

In accordance with the present invention, compaction data is necessary to allow new routines to be used which act to define and filter out several remaining components of property change and therefore risk. Compaction, expressed as velocity change with depth change, varies relatively little within homogeneous sediments. Clastics compact at a rate of between 0.2 and 0.5 m/s/m, from fine to coarse sediments, respectively, if they are homogeneous, and normally buried, with these possibly gradients increased in the presence of non vertical stress. Chalks and other carbonates tend to compact at a rate which is about 75% faster than that of clastics. Vertical lithological change in deposition can make gradients appear significantly different, but the whole sequence will tend to compact at a rate related to the overall proportions of the lithologies present. Therefore, a clastic sequence which fines upwards will show a higher "apparent" compaction gradient that a homogeneous clastic, but compact with depth at a different, clastic related rate. Most causes of property change associated with burial anomalies tend to have the effect of further, and locally, increasing velocity and density, and compaction rate, and reducing porosity.

A relationship is perceived between fast post depositional anomalies and time pull ups. (See FIG. 9) Steeply dipping reflections associated with diffractions, fault planes, and local structural dip may also cause fast seismic data to be anomalous and present. Fewer reasons exist for seismic data to be validly and anomalously slow, and we can use this within our quality control and risk analysis. All velocity data plotted as suggested may therefore ambiguously represent lithology. Deductions regarding lithology from any published velocity depth plot will therefore be suspect, and should be qualified, for example by the word "apparent", until they are normalized to the extent now possible under the present invention.

c] An estimation of compaction is necessary. This can be quality controlled. For both well data and seismic derived data, per control point, both "apparent" compaction, and that compaction gradient relevant to the bulk lithology per sequence at that point should preferably be estimated. It is the latter which is appropriate for modification for use in depth conversion, etc., and the former which is appropriate for definition of sequence depositional and post depositional burial changes, and spatial behavior. Concerning seismic VStudy point data, three categories of material may exist.

i] Where no original time/v.r.m.s. pairs define an interval wholly within the later defined seismic sequence. Plot as single points on (default linear) sequence velocity/depth diagram, possibly subdividing into areas, and use in regression with a low weight.

ii] Where one original processing time/v.r.m.s. pair defines an interval wholly within the later defined time sequence, and it has not subsequently been smoothed or rejected. Plot and use in regression, with higher weight.

iii] Where two or more pairs are within the interpreted sequence, and their combined effect is not later smoothed or rejected. Plot and use in regression with higher weight. In this case, they may be processed to reveal local compaction.

d] Having defined, per sequence, spatially variable "K" values, with K as defined conventionally in BECVEM and its referenced publications, it is necessary to generate two smooth map surfaces. For each such map surface, "smooth" in this context means that a gradient between any two points has to be geo-scientifically possible, not necessarily geo-probable. Well data should be honored (default 100%), with smoothing taking place depending upon perceived data reliability, (default, see [c] [i], [ii], [iii] hereinabove).

The K value derived for depth conversion use and within the postdepositional and depositional modelling program areas should preferably represent a close approximation of how the sequence compacts. In this respect, the K value will be closely related to the widespread evidence available. The principal constraints involve data values at discrete points. These should represent known normal behavior of the apparent lithology, with a variability of between 50% and 200% of the values described by Gardner (see FIG. 8) for that lithology suggested as a default, for K data used in depositional lithology studies.

For K data used for modeling and depth conversion, the default constraints should preferably be significantly less. A secondary constraint should represent gradients of compaction between any two points. These should not exceed the default given (30% per k.m. suggested).

Definition of a surface "K" allows a representation of VI as Vo and K to be made. (Per BECVEM and references therein.) This allows generation of a new set of sequence Vo (velocity normalized to datum) maps to acceptance-check and to quality control the analysis of the prospective area.

e] Per well, and per Vstudy point, we now have "apparent" sequence data representing "times", which are possibly mispositioned, and "velocities" also possibly inaccurate and mispositioned, and "depth geometric data", which is also suspect. All three have been constrained to an extent consistent with the allowance of geological trends which may be present, to be expressed.

5. Risk Assembly. Per shot point, grid point or VStudy point it is necessary to track and correlate risks, per sequence. Classify specific local level risks in respect of data risk, post depositional property change risk, depositional facies change risk. Within the work domain, as shown in FIG. 20, needs to be created, per sequence, spatially, a data interpretation risk field. See FIG. 17, to this "directory" that material evidence needs to be added which infringes upon any probability that what is being prognosticated as apparent and valid, may not be so. Per point in space, add and retrieve new evidence derived from material evidence concerning T, V, D or derivatives thereof effected within SPIRAL, with lithology and compaction factor, and other item listed under Parameter Column figure, such that:

(1) value, per sequence, is outside default/user given guidelines, has been rejected or smoothed per sequence/location point; this is noted.

(2) where two vertically adjacent sequences at a common part in 2-dimensional geographical space both illustrate an excess of the same polarity, or of opposite polarity, relative to user, or default, guidelines, for a parameter; then each is noted.

Part 2. Seismic Depth Data contents:

| Stage A. Sequence Normalized "Apparent Data" Depth Conversion | EE & SS |
|---|---|
| Stage B. Sequence Property Change Normalization | |
| i] Post-Depositional Alterations | EE, SS & BB |
| ii] Depositional Facies Distribution | EE & SS |
| Stage C. Spiral Depth Conversion | EE & SS |
| Stage D. Spiral 3-dimensional Matrix Migration | EE & SS |

Stage A. Sequence Normalized 'Apparent Data' Depth Conversion

Velocity is a property of seismic sequences which may be related, via processes known to experts in the art, to a suite of other sediment properties critical to investment in exploration and propsecting activity. When associated with knowledge of lithology, velocity may be related to acoustic impedance, resistivity, porosity, density, fluid content & property, etc. Addition of material information concerning pressure and thermal behavior and history allows fine tuning of quantification of these properties. Refinement of normalized "apparent" velocity data for the purpose of improved depth conversion necessarily improves accuracy of perception of reservoir properties, fill, hydrocarbon generation, migration loss, developable reserves, etc, if we choose to make the appropriate connections.

Depth Conversion of normalized "apparent" velocity data and time sequence data, in accordance with the present invention, requires bringing together:

i] time data of sequence boundaries and their thicknesses, a] from discreet shot point or common depth point locations, or b] from gridded data, generated from [i] [a], and ii] velocity data of sequences, incorporating data describing behavioral characteristics in space of velocity change with depth, expressed as linear (recommended) or non linear, subject to evidence, relationships.

Since this velocity data is likely to be derived from less data control than i] above, and include well data control, it is probable that the bringing together will require that velocity data is gridded. Then, either time data can be gridded to make coincidental spatial data, or velocity data can be resampled to time data locations, and then appropriate depth conversion functions for sequence mid point depth versus interval velocity should preferably be applied, such as:

Where $Z1, Z2$=depths to sequence 1, 2 etc., upper boundaries (meters).

$t1, t2$ =time [1 way] to sequence 1, 2, etc., upper boundaries (seconds).

K=acceleration factor, (meters/sec/meter).

Vo=velocity at origin, (meters/sec/meter), derived as intercept of K at surface, by Vo=Z (midpoint), times K, minus V.interval.

V.interval=(Z2−Z1)/(t2−t1).

Using a]

$Z1\ eK(t2-t1), Z2 = Vo/K[eK(t2-t1)-1]+Z1\ eK(t2-t1)$, or b]

V. interval=Vo+(K×Z1)/1−(0.5K×[t2−t1]).

Depth conversion [EE] is performed at grid points, or time data locations, or using more complex models. 3-dimensional migration may be performed on appropriate data to quality control ties to well or other control. The purpose of depth conversion at this stage is partly to further quality control this "apparent" data, and partly to prepare data for separate analysis to quantify each important post burial change or depositional facies variation.

Stage B, Sequence Property Change Alteration i] Post Depositional Alterations

According to the present invention, data has been constrained by SPIRAL incorporating several defaults, and according to the teachings of BECVEM. It contains evidence which is consistent with strong possibility. Data needs to be further constrained to be consistent with probability. Current data remains as "apparent" in that it appears possible, and is the result of valid geo-technology. Current drilling statistics suggest that data, less constrained than this and seeking mere possibility, is usually erroneous. Thus, for such data to be made more realistic and less risky, requires the application of defined changed in industrial methods or principles.

Part I hereof contains several minor, newly defined changes. Commencing with Part II hereof, however, these changes are significantly enhanced and deviations of the teachings of SPIRAL from conventional exploration and prospecting technology in the art becomes clear. In accordance with the present invention, the integration of a new work domain differs from present industrial or applied scientific methods by significantly increasing the conventional work load, thereby providing ways and means to industrially use material for benefit that would otherwise not be realized. This new methodology requires investment in new user skills. These requisite skills tend to be maximized with use of less technology, and, contrariwise, tend to be minimized with use of more technology. As will be appreciated by those skilled in the art, the SPIRAL work domain (outlined in FIG. 22) contains, relative to work domains normally used by those skilled in the art, increased geophysical-derived evidence per point in space. Much of this new evidence concerns geofactors localised control upon sequence geoproperty. In other words, aided by SPIRAL, geophysical interpretation has been expended to accomplish a large measure of geological interpretation using new, principally computerized (machine work), routes to generate new and additional local evidence of underlying geology.

While less exact than evidence historically measured by geologists using well control points, the newly qualified evidence advantageously provides extra information related to behaviour between wells (and also related to behaviour of wells). As will be appreciated by those skilled in the art, SPIRAL enables a many-fold cumulative increase in spatial knowledge, each constituent part being less accurate than that conventionally used by geologists and the like, working from directly sampled well data, using cuttings, cores, and electric log material.

BECVEM and SPIRAL both define and interrelate behavior of factors in several ways. A common theme used is the reduction of many parameters to aid definition of behavior within the domain of sequence/lithology/depth/velocity/compaction. From this domain, most other relevant factors can be defined with methods now known. Within this domain, behavior is, to a large extent, interdependent via a suite of known relationships. This allows causes and effects within the domain to be cross-referenced and quality-controlled, and also has led to establishing new methods and principals herein described in detail.

A part of the new methodology disclosed herein involves BECVEM concepts and processes, which have been tested in an industrial setting via at least two separate systems built with different embodiments thereof. Thus, it has been learned that proper use of BECVEM increases geology and geophysics work load and management by several percent, thereby achieving proportional reduced risk of drilling dry holes, to an extent which economically compensates. As will become clear to those skilled in the art, SPIRAL teaches a practical new methodology to define and integrate several other under-used factors of relevance, further increasing geology and geophysics work load to achieve reduced dry hole risk. As will be appreciated by those skilled in the art, SPIRAL also is provides a blueprint allowing this improvement to be associated with improved automation using computers.

BECVEM summarizes processes which:

i] Allow definition of sequences via Vertical Lithological Variations.

ii] Allow definition, per sequence, of Lateral Velocity Variations.

iii] Allow definition, per sequence, of Vertical Velocity Variations.

iv] Allow definition, per sequence, of Lateral Lithological Variations.

v] Allow definition, per sequence, of Residual Velocity Variations, including via use of gridded seismic interpretation data, tectonic change to sequence property, Salt (or shale] inversion—"Sinva", Basin inversion—"Binva";

Non vertical compaction—"Convan";

Faulting—"Fanva";

via use of well data, other changes to sequence property;

Pressure, Fluid changes—"Penva";

Thermal, Intrusive changes "Tenva".

Use of grid point data generated within these systems allows further new and different processing to assemble and summarize sequence structural information, such that an historic perception of stress/strain may be assembled, and used in the risk assemblage to quality controlled other factors. At 5500 meters depth, a pure quartz sandstone in normal burial, has the velocity of salt. At 3300 meters, this sandstone, given an horizontal stress component equivalent to about a third of its burial weight, can also acquire the velocity of salt. Environments, such as strike slip compressional duplexes, may cause this change.

SPIRAL, containing BECVEM, can define, quality controlled and filter out this effect. Thus, working through the methodology taught by BECVEM, apparent sequence property behavior is qualified, or filtered, to firstly, make it possible, visa vis the observed general model established by the process, and secondly to make it probable, by filtering from [iv] LLV above, separate, localized changes defined in [v] above, RVV, to better quality control depositional behavior. BECVEM, per process, looks for evidence of change, per sequence, at control such as wells, then separately looks for evidence in the seismic macro-form, which is sampled for quality control at control data locations, and then applies the change as described as being suitable by the seismic form. Since the "residual velocity variations" [RW], tend to be post depositional variations, which are invariably:

a] not distributed linearly between control data locations, and b] may not be sampled with acceptable accuracy via the seismic process on a trace or micro scale, and c] BECVEM is the sole method now known capable of deriving and transferring relevant material defined on a macro scale (and verified on a micro scale at control data points), to the macro scale, then part of SPIRAL is obliged to use BECVEM processes.

According to the present invention, removal, per sequence, of spatially variable burial history variations lets SPIRAL use new processes to separate and quality control the factors which influence sediment property at time of deposition.

ii] Depositional Facies Distribution.

Since "Seismic Stratigraphy" was invented, scores of dry holes have been drilled in each of many basins where a misinterpreted or misrisked depositional facies exists. E.G.:

a] Pearl River Mouth Basin, China, where lacustrine low energy sediments of source potential can be differentiated from higher energy sediments of lesser potential, only via Seismic Stratigraphy, and normalized velocity interpretation of the type described.

b] North Sea, Southern, where thickness variations in fast velocity basal unit anhydrites are visible to interpretation by a combination of Seismic Stratigraphy & normalized velocity interpretation techniques.

c] North Sea, Southern, where the Lower Chalk sequence is rarely picked as a separate sequence, yet it locally achieves a 50% velocity variation from normal chalk, with the phenomena readily interpretable using Seismic Stratigraphy & normalized velocity techniques.

These and other depositional facies distributions are now understood principally by the drilling of, in each case, many dry holes. As will become clear to those skilled in the art, the present invention provides new technology which spatially sees depositional facies clearly for what they are. Published documentation on seismic stratigraphy describes the parameters which allow definition of Seismic Sequences. See, e.g., A.A.P.G. Memoir 26, and most commercially available training courses on the subject. SPIRAL has added several new processes particularly in this area of velocity evaluation, designed to improve the autodefinition and picking of seismic sequences, and defining localized occurrences of sequences with properties observed as outside a default defined behavior range relative to bounding sequences.

Current seismic stratigraphy knowledge shows how, per sequence, a] the external form, examined with the internal form expressed as a "chrono-stratigraphic section," defines spatially variable facts about the depositional environment.

b] boundary behavior, and gaps in the sedimentary record define spatially variable facts about the depositional history.

SPIRAL requires that several pieces of information are defined per sequence per shot, common depth, or grid point, (or default, per VStudy point), out of data already loaded, stored and interpreted, such that our improved knowledge of spatial variations in sequence property may be further verified. SPIRAL's quantification and quality control of depositional facies analysis continues use of the lithology velocity domain as a common denominator allowing visibility of most industrially relevant rock properties.

Sequence Internal & External Form

Data held in SPIRAL needs to be processed to interpret, spatially if deposition, is:

terrestrial, mainly lacustrine or fluvial near shore shelf slope abyssal

These terms are used to define the principal environments of deposition of sediments. Lateral and vertical sequence change in deposition lithology are habitually constrained by what is physically possible, in such deposition. SPIRAL seeks to incorporate a framework whereby improbably behaviour is highlighted, such that the improbability of this occurrence may be associated with a risk that such progress is not 100% probable. For example, near shore shallow water clastics may be interbedded with evaporitic sediments, but not with deep water carbonates. According to the present invention, this information should preferably be quality controlled with other seismic stratigraphic data and "apparent" lithology, as ascertained from the processes performed to this stage, to define depositional facies. A picked sequence should then be examined for indications of environment of origin, alteration in a spatially acceptable manner, quality controllably by integrated defaults.

Method

In accordance with the methodology taught herein, sequence time tops and bases, per shot point plus trace waveform, are linked to the ability to correlate laterally from trace to trace and pick seismic events. Chrono-stratigraphic sections can be readily constructed by [auto] picking all internal events which have the characteristics of bedding planes, and flattening them. The sequence boundaries then may either be parallel to or intersect these planes. This allows SPIRAL to benefit from a seismic stratigraphy capability, which need not be complex.

The following parameters, per sequence, are sufficient to provide key corroborative evidence to material previously defined [default, e.g. at seed zones]:

1. Chronostratigraphic Section

Shape gives indication of environment of origin, from land to deep water. Slope sediments, are defined by vertical offset of younger, (higher), planes in the direction of deep water, i.e. the sequence boundary relationships are angular and the upper boundary rises towards slope front. Shelf sediments, tend to show much weaker evidence of the same, & Terrestrial and Abyssal sediments, tend to show less divergence and less trend.

2. Pattern of Boundary Relationships

The pattern of boundary relationships may be classified fully as follows—(retaining reasonable information using #): layered; simple (i.e. parallel #, divergent #); complex (i.e. oblique, sigmoid); reflection free; chaotic #.

It has been found that terrestrial, inshore, large lake sediments tend to show parallel layers, occasionally divergent / chaotic. Shelf has been found to be generally parallel, locally weakly divergent. Slope has been found to be generally divergent, locally chaotic; abyssal, generally parallel, locally chaotic.

3. Character of Internal Reflections

The character of internal reflections, in terms of amplitude, frequency or continuity may be quantified. Analysis of the latter alone may suffice.

Terrestrial, discontinuous

Inshore, large lake, generally discontinuous, locally continuous

Shelf, generally discontinuous for clastics, generally continuous for carbonates.

Slope, generally continuous

Abyssal, generally continuous, locally discontinuous.

4. BECVEM Normalized Velocity and Depth

The BECVEM normalized velocity and depth are both known and stored at each shot point, and can be plotted against velocity/depth/lithology to define current best estimate of lithology.

Terrestrial, shallow inshore, clastics, limited

Carbonates, evaporites

Shelf, clastics, carbonates

Slope, clastics, carbonates, reefs,

Abyssal, clastics, carbonates,

Locally, well derived knowledge makes seismic stratigraphy unnecessary in a province. In most underexplored basins, seismic stratigraphy is a useful tool. Generated as hereinbefore described, most relevant factors may be readily separated and cross-referenced, more economically and quickly than hitherto. Defaults may be set by users, but the hereinbefore described parameters may be defined with little manipulation, using material already assembled, loaded, worked and stored.

Four families of variables have hereinbefore been described, from which classification into one of five depositional areas may be possible. The main similarities likely to exist in this preferably computerized analysis, are between carbonate shelf and abyssal sediments. A sedimentary wedge exists between the two areas. This, and its landward and oceanward sides, are readily recognizable by the plurality of processing steps described herein, and can be used in the definition analysis. See FIG. 18. Using a classification where a lithology as inferred using normalized velocities, is compared and contrasted against evidence derived as outlined for (2) chronostratigraphy (3) sequence pattern, and of (4) sequence internal character. A user can aid deduction of probable environment of origin. (5) Therein have been assembled five lanes of material evidence relevant to lateral and vertical geoproperty behaviour, to better determine the probability that such evidence is meaningful.

Each province is associated with different potential for probable change in property per km., (in the sequence/velocity/lithology/depth/compaction domain), and this may be built into default filters. Inshore sediments may be variable. Shelfs may grade from clastic to carbonate rich, slopes may contain reefs, or gravity slides, etc. A majority of depositional features, (incorporating channels, fans, allochronous units, reefs, etc.) may be separately interpreted as L.V.V.'s; others represent conventional, vertically separated units, V.L.V.'s, such as interbedded salts and other, faster velocity evaporites. The most significant causes of depositional property change result in separate picking of seismic sequences. The next most significant cause of property change is the result of an anomalous burial history, which is now also discernable. Earlier measurement and analysis of post depositional processes have defined activity during (or between) deposition of later sequences. This allows correlation of the action of the process with the concurrent deposition.

Per data control point, grid or seismic common depth point, is needed, for all sequences from surface to reservoir or source, a classification describing:

a] the sum of extension or compression or other potential cause of burial change to which it has been subjected, and, derived from that, b] the component of extension or extension that existed during deposition. The base & top, and thickness, and dip, and directions and patterns of behavior of a sequence may be examined to help quantify this factor.

Conventionally, facies distribution is a regional classification within a basin, made by assembly of material information concerning depositional history, depositional environment, and lithology. According to the present invention, no. 4, Post-Depositional Change, described herein, is rarely mentioned in literature, yet it can alter the "apparent" definition of lithology, and thus the ascertained facies distribution. In accordance with the present invention, no detailed work on facies distribution within the SPIRAL is appropriate until sufficient processing is performed to define apparent sequences, and their lithologies, before estimation and removal, by filtration, of all localized (RW) post depositional causes of property change.

Per sequence, defaults are preferably built-in which allow specified rates of change in parameters stored. An observed spatial change in one parameter may be associated with an expected change in another parameter, and this should be researched and used as substantive evidence. The design criteria at this stage require more that this capability is built in than that every relationship between potentially related variable parameters is quantified. It is suggested that to avoid unnecessary data manipulation in prototype use that data describing these parameters is held at locations of well and original seismic Vstudy point control.

Conventional computerized interpretation systems store, in addition to trace data concerning waveform, sequence boundary time and velocity data. SPIRAL requires that extra data fields exist to allow definition and cross-referencing of:

boundary pattern, sequence character, compaction characteristics, post depositional changes to property (of which several types may be present—see FIG. 8), "risk" of fit between observed behavior of one factor and observed behavior of another, depositional environment facies.

Significant lateral and vertical changes in sequence rock property may occur without accurate representation in apparent data. SPIRAL micro scale trace property data should preferably include reasonable representation, of intrinsic apparent property, of observed probable changes through burial, and of observed probable changes through deposition. This allows SPIRAL to give more credence and less risk to property behavior which is consistent with all three, and to give progressively less credence to behavior which is inconsistent with any two, or one, of the three. SPIRAL also allows cross-referencing of observed post-depositional changes against the effect of such action on contemporaneous deposition.

Before SPIRAL depth conversion and migration, it is necessary to further filter/quality control apparent normalized sequence velocity data.

1. VI, permitting change defined by default (default, as +/− <25%/km velocity) within overall limits defined by apparent lithology. (Part 1)

2. Observed probable change with burial history and creation of filters to express the effects of each process. (Part 2, +/− <15%/km velocity, in most basins).

3. New filtering of mapped normalized data is required, with defined and removed post depositional changes, so that remaining changes can be highlighted, defined by default as +/−> than a % amount (e.g., 5% )/km.

Filtering of changes highlighted in 3 hereabove is performed to confirm their credibility via i] Depositional environment, province, ii] Change in pattern iii] Change in character in vicinity of control which gives rise to anomaly, iv] Defining the number of control points which give rise to anomaly, v] Examination of bounding sequences to view presence of anomalies which may be relatively fast or slow in velocity.

Each is weighted (default +/−20%), such that a change substantiated by all five (i–v) tends to remain, but a change not substantiated by three of all of these five is reduced by a related default (e.g., 60%).

The subsequent SPIRAL normalized sequence velocity distributions are then accepted and used to participate in other SPIRAL processes, including:

sequence depth conversion, 3-dimensional matrix migration, depositional facies/lithology mapping, mapping for reservoir, source, seal, migration properties, risk analysis

Stage C. SPIRAL Depth Conversion

SPIRAL sums sequence post depositional change velocity filters which are quality controlled against both apparent normalized velocity, apparent compaction, and apparent lithology. The removal of the burial change from apparent data leaves mapped sequence velocity data prepared to be a representation of depositional control. The normalized, RVV filtered velocities are then further quality controlled against Seismic Stratigraphy observations as shown. The quality controlled filter sum is added to SPIRAL depositional behavior velocity, to create velocity fields to represent appropriate current behavior. The resultant sequence surfaces may be further quality controlled against conventional modelling techniques. The SPIRAL time sequence layer cake data set exists with material stored at compatible and accessible locations.

Control data is tied by this process because the velocity changes experienced at the well location include quality controlled components of burial and other changes, are used to define the quality controlled components of burial and other changes, and are used to define the filters. The estimation of property at early deposition includes normalization which allow tie to wells which are not anomalously effected by post depositional R.V.V.'s. Depth conversion proceeds as hereinbefore described, but with the improved velocity material.

Stage D. SPIRAL 3-dimensional Matrix Migration 3-dimensional grid or common depth point migration of 2-dimensional data and ray tracing each give results which are related to the velocity model used. Migration systems designed for 2-dimensional stack or 2-dimensional migration data are commercially available, and their effectiveness is part dependent on the variation of dip components and directions, relative to the direction of sampling. Data needs migration in three dimensions, and for this to be associated with an ability to view 2-dimensional recorded seismic trace data in its migrated position, that data needs to be moved in three dimensions.

Seismic energy travelling from an energy source, spherically downwards, and reflected off a sequence boundary to return to a receiving microplane or geoplane, is allocated to a depth point. Where these sequences are horizontal, that depth point tends to be vertically below a mid point between source and receiver. Where those sequences are dipping, the point where energy is reflected from, is somewhere "up dip" of the mid point between source and receiver. Various 2-dimensional and 3-dimensional migration algorithms exist which work to define and restore seismic reflection data to its position appropriate for a corrected ray path. Such algorithms are highly sensitive to the velocities used. Therefore, an improved knowledge of sequence velocities as ascertained via SPIRAL has application in the seismic 2-dimensional and 3-dimensional migration.

It should be clear to those skilled in the art that the improvement in knowledge of velocity attributable to the combination of BECVEM and SPIRAL methodologies will allow much improved migration and ray tracing to occur. The term "matfixing" as used herein refers to the obvious possibility that a combination of pre-existing migration technology plus improved evidence of sequence velocity behavior may allow not only improved migration of sequence boundary surfaces, but also improved migration of 2-dimensional and 3-dimensional acoustic impedence trace wave data to a 3-dimensional position, often out of the plane of a 2-dimensional section. Furthermore, the matrixing herein described would then allow interpretation between the now locally non-vertical non-2-dimensional trace wave form, and all points in space between that waveform and adjacent trace wave forms. This process may be guided by time boundary interpretation data and by the migration process and by the sequence velocity evaluation.

It should also be clear that SPIRAL will aid the migration processes known to those skilled in the art to the extent that conversion of 2-dimensional data to 3-dimensional data will be facilitated by the improved knowledge of spatial velocity lithology and property. Given this relatively improved level of understanding, the methods and means necessary to effect this step exist within the prior art.

Therefore, each 2-dimensional shot point or common depth point trace may represent a spatially variably subsurface. If sufficient time data coverage and velocity data coverage exists, the 2-dimensional data can usefully be matrixed in SPIRAL to a simple 3-dimensional grid using, for example, technology already proven in 3-dimensional map migration. This allows trace information which describes a point in space to be allocated that space and for all other points to be described with a best estimate of that space. It further allows new data to be added to cover estimated points in space to quality control process effectiveness, and improved integration with data recorded and processes as 3-dimensional.

Since a 3-dimensional depth migration process generates the information necessary to change trace data from 2-dimensional position to 3-dimensional position, it can also be used to scale time sectional data to become depth sectional data, thus allowing the 3-dimensional seismic character information grid to be in depth. The velocity depth relationships necessary for such action exist, and current migration algorithms may have to be adjusted to include these relationships. The seismically derived velocity control information, and the corrections to it derived by analysis of post depositional and of depositional data represent 2-dimensional defined positions. The algorithms used in control therefore need to move that control to the appropriate 3-dimensional position, and reiterate defined control parameters.

Time trace waveform data is sampled every few milliseconds, whereas sequence boundary data and sequence chronostratigraphic internal bedding data boundaries are sampled at larger intervals. To matrix a grid of acoustic impedance data between points of migrated 2-dimensional depth trace data requires additional action. Sequence thickness variations will occur, and these may be related to:

erosion at top, base or internally variable deposition,

New action:

i] interpolate depth thicknesses from new 3-dimensional positions of seismic data.

ii] analyze and match acoustic impedance waveform, weighing more heavily control data, and low risk data defined in "Risk Assembly." Change between the new 3-dimensional shot point or common depth point's must be as gradual, in property terms, as SPIRAL's preferable defaults have allowed, so wavelet change should represent this, and can be guided by adjustment to cause a smooth interpolation.

iii] the measure of interpolation required can be stored in the Risk Assembly.

iv] where the chronostratigraphic/pattern data clearly defines sediment loss in an area, it is likely to be by erosion from the top, and this may be built into the waveform matching routine as a default.

v] the matrixed 3-dimensional acoustic impedance data set original trace forms may be (color) coded differently from that which is interpolation.

vi] projects worked in SPIRAL will have invariably have generated relevant material which is spatially different from other interpretations using the same data.

Under the present invention, those skilled in the art have access to a different perception of sequence time, velocity and lithology; of compaction data; of burial changes, depositional facie; and of depth conversion and 3-dimensional position. SPIRAL project data still will benefit from quality control through section balancing and palinspastic reconstruction, and perceived fit of models created may usefully be added to the risk data.

Several commercially available workstations contain capability regarding:

trace waveform A.I./Time data post stack processing log data manipulation manual, semi-automatic, automatic sequence boundary picking mapping/gridding migration/ray tracing 2-dimensional and 3-dimensional visualizations and are thus suitable for adaptation to perform SPIRAL computerized application. Typical workstations include those of Landmark Graphics and Schlumberger Geoquest, but it should be clear to those skilled in the art that the technology and techniques disclosed herein may be implemented on virtually any commercially available computer, including mainframes, minicomputers or microcomputers, provided sufficient processing power is provided thereby. With the steadily increasing processing power afforded microprocessor-based workstations, however, the opportunity exists to incorporate SPIRAL technology and methodology into such workstations (possibly even stored in ROM or EPROM) and for use thereof in the field at or near the point of data collection and the like.

Part 3. Seismic Lithology/Property Data i] Lithology.

The objective in Part 3. [i], is to classify and store, for all sequences at all locations sampled, a definition of lithology, including compaction, categorized by rock type, velocity and depth, such that properties relevant to reserve and risk may be later calculated. It should be evident that SPIRAL deals with seismic sequences. The translation may retain the acoustic impedance trace waveform, and denote lithology via color coding, read directly off an adjusted velocity/depth/lithology chart of the type described hereinbefore, with due regard for the time-averaging equation. Velocity/depth/lithology plots used as figures herein are schematic. Where a sequence picked is inhomogeneous in that it contains interbeds of mixed lithologies, e.g., fine and coarse clastics, or clastics and evaporates, then the overall velocity will be distorted accordingly in a manner known to artisans such that the SPIRAL work domain grids may be adjusted to accommodate this occurrence.

Direct translation, with usable accuracy, between velocity and lithology, is practical only where velocity is known with an accuracy of around 95% or better, which is currently achievable in most areas of most basins, by those skilled in the art, and which the system described is expected to enhance, in over 90% of areal extent of most basins, to a depth in excess of 3000 m., for seismic sequences as described, and where the burial history is normal, extensional or abnormalities are quantified. Techniques pioneered by Gardner, and recently upgraded by Carter have been modified by work described herein, to the extent that the translation described is now practical concerning the vast majority of basin sediments of industrial interest for oil and gas prospecting. Previously, effectiveness as defined by analysis of drilling results was demonstrably unacceptable in the many areas of many basins where property change by burial history was undefinable by technology.

Within the SPIRAL solution constituting the present invention, data is organized for application of two alternative embodiments. The first is as described hereinbefore, and allocates one lithology/sequence/grid or shot point. It is this method which is recommended for prototype use, and may then readily be displayed on map or cross section. The second embodiment would be sensitive to vertical change in sequence lithology, via analysis of acoustic impedance variation per point, i.e., all points, or sample points, such as seed points. Existing technology can attenuate much reflection data which is irrelevant to the sequence in the space in question. Knowledge improved through SPIRAL may be applied through this existing technology to further improve that attenuation. The reflection data also needs qualification to confirm behavior is compatible with existing knowledge, and with neighboring trace data, and with data from bounding sequences.

SPIRAL and its BECVEM component allow definition of sequence property changes and their separate manipulation and quality control within the velocity domain. Knowing velocities / lithologies/depths, then, permeability, density, porosity, etc., can be calculated using knowledge in the prior art. Auto definition of the suite of properties essential to the analysis of prospectivity, reserve and production estimation is viable.

In summary, velocities used to be variable, relative to the ability to perceive, in respect of:

resolution, by up to 15%, anomalous burial change, effecting clastics & many carbonates, i.e., most sediments of interest, by up to 15 to 30%, depositional change, by >15% and allowed more than one reason to doubt detailed classification of lithology, or other properties, using velocity, despite the fact that for simple basins there is a simple, accurate correlation method available.

ii] Property

A] The objective in Part 3 [ii] is to define, using criteria known to those skilled in the art, from data now held in SPIRAL, those lithologies and their associated properties which are of economic interest, as either reservoir, source, or seal. Deposition heavily influences lithology, which is separated, as a space parameter, in SPIRAL. Variation in clastic sand/shale, or carbonate/clastic, ratios provide evidence of a behavioral relationship between depositional lithology and velocity. Burial heavily influences the present properties of each lithology at each point in space, and is also separated, as a parameter, converted to the velocity/depth domain, in SPIRAL.

Per defined lithology, a behavioral relationship exists between burial history/velocity/porosity/permeability. Accordingly, within SPIRAL there should preferably be a classification, pre-defined or user input default of each lithology, related to variations in physical properties known by well, or other direct sensing, to be possible, and then translated to the velocity/depth domain, and the potential to act as either reservoir, source or seal. This establishes a set of criteria, per lithology, which can be used to review all sequence SPIRAL interpretation data, to locate the presence of volumes of sequences which have:

appropriate properties to act as either reservoir, source or seal.

inappropriate properties to act as either reservoir, source or seal.

B] To achieve these objectives, the definition already generated and held in SPIRAL of:

depositional lithology, current velocity, and depth may be used to define other properties. As has been hereinbefore described (see, e.g., FIG. 12), each sequence, per grid point has in SPIRAL a classification describing: (a) present velocity and depth and (b) depositional lithology type. If point B in FIG. 12 indicates that the depositional lithology type was a pure quartz sandstone, for example, then an improved and automated definition of present properties could be achieved by calling up from a computerized database a classification of properties such as that illustrated schematically in FIG. 15. Transferring to the schematic shown in FIG. 15 those points A and B from FIG. 12, point A plots on the normal depositional line and point B plots somewhere in the grid shown. For each point in the grid, data can be compiled from the prior art using well data, such that other wells having a similar sequence depositional property (via point A) and present property (via point B) may be examined to more clearly illustrate behaviour in respect of other physical properties. The parameters necessary for fuller geological understanding are summarized in FIG. 2.

In particular, porosity, permeability, net to gross, and certain parameters (11, 12, 13) relating to reservoir engineering, or other parameters, (17, 18, 19, 20) relating to source behaviour, may be better quantified. It should be noted that other parameters may also be served with improved accuracy through SPIRAL actions. These include lithology, age and history, thickness, crest depth, gross rock volume, vertical closure, and post tectonic processes. Furthermore, such that all common lithologies may be subjected to this new tool for improved derivation of properties, it is advantageous to construct property behaviour grids for all lithologies (see FIG. 19).

As should be evident to those skilled in the art, SPIRAL needs conventional capabilities to translate what it has deduced concerning velocity, lithology, time, depth and spatial form data into parameters sufficient to classify reservoir, source and seal.

| AREAS | PROPERTIES TO BE DEFINED (*SPIRAL) (#Res.Eng) |
|---|---|
| Reservoir: | *porosity |
| | *permeability |
| | *net/gross |
| | *thickness |
| Seal: | *porosity |
| | *permeability |
| | *thickness |
| Trap: | *depth |
| | *vertical closure |
| | *gross rock volume |
| | #recovery factor |
| | #fluid saturation |
| | #expansion factor |
| | *fill |
| | ? in place/recoverable reserves |
| Source: | *volumes |
| | *maturity # richness |
| | *path |
| | *migration loss |
| | *type |

(Note that *, &, ? denotes where data generated in SPIRAL is expected to, or may, be readily processed, using conventional methods known to those skilled in the art, to allow improved spatial understanding, to complement conventionally interpreted data). # Trap parameters may be entered via default system using known analogies, amendable by choice.

Summary of the Effect of SPIRAL's methods

1. SPIRAL's early depositional velocity is stored with depositional lithology.

2. SPIRAL stores in filters normal/abnormal burial changes to velocity.

3. SPIRAL's normalized velocities holds information (1. and 2. herein), representing the present.

4. SPIRAL can access past and present velocity, with past and present lithology.

5. SPIRAL can therefore calculate sufficient property parameters to define reservoir, seal, trap, source, supplemented by available well and/or regional data, or defaults from known analogous sequences.

6. SPIRAL can contain, or be attached to, conventional log analysis capability available to calibrate and quality control its own conclusions.

Part 4. Hydrocarbon Resource Project Economics

Method

The purpose of Part 4 is to summarize risk information and materials necessary to determine the appropriateness of future expenditure or investment in respect of acreage acquisition, drilling, or data acquisition, associated with the purpose of location of economically developable reserves. The appropriateness will be judged upon:

Cost

Reward

Risk

Risk, of course, is the probability that factors described are wrong.

Stage A. Auto Definition of Traps

Embodiments of the present invention should preferably include data relating to environments about which knowledge has been acquired by geotechnical work associated with:

a. Direct sampling, with interpolation between directly sampled points.

b. Remote sensing, with interpretation calibrated to data points.

c. Interpretation of hydrocarbon resources and production methods.

Other data concerning economic assessment should preferably be summarized to define:

d. Obvious costs such as data acquisition, processing, drilling, interpretation, management, transportation, production, taxation, etc.

e. Expectation of future income stream and expenditure stream.

Virtually all material of relevance to the purpose is interpretation of perceived probable fact, and therefore is associated with risk. Items a, b, and c may more properly be processed within SPIRAL to define cost, reward and risk, and therefore some minor additional capabilities are required.

Throughout the industry, upstream documented material requests for capital investment, e.g., "Applications for Expenditure" and "Geological Evaluation Memorandum," share a similar format, and this should preferably be built into computerized implementations of SPIRAL to aid management's decision making. It should cover all potentially relevant facts, and where those areas are not covered in SPIRAL, a default system should preferably add its most effective estimate, and remind users to perform the necessary analysis. (See STAGE B).

To achieve organization of industrially processed material necessary to isolate traps, using potentially relevant facts derived from geology and geophysics, SPIRAL should preferably:

i] access material hereinbefore defined, and ii] use it in conjunction with SPIRAL depth structural sequence boundary material, iii] to define reservoir closures [structural/stratigraphic], iv] which are associated with a seal, v] and appropriate source and migration route.

Thus, SPIRAL uses conventional technology to:

i] Define reservoir, source, seal, migration path parameters, using SPIRAL definition of lithology and normalized velocity, depths, etc., calibrated where possible with well or other data.

ii] Define all volumes of all sequences where reservoir potential exists.

iii] Define all closures of all sequences where, aerially, reservoir exists, assuming that all upper sequence boundaries seal.

iv] Define reservoir closures that are sealed.

v] Define sealed reservoir closures that are within (default) distance of source and migration path acceptable (to defaults).

Then, per trap, important factors which SPIRAL has to define are:

oil/gas in place, recoverable.

risk.

Risk of non-achievement of reward associated with investment in exploitation of perceived, trapped reserves is a compounding of each relevant parameter. Under the present invention, SPIRAL must gather each via sequences, and separate resolution of data, depositional, and burial parameters. Each must be cross-referenced against local perception of geology, well data, and geophysics, and seismic data. SPIRAL does not change known risk technology, except by reduction of factorial compounding.

Stage B, Reservoir, Seal, Trap, Source Property Definition/Risk.

1. Reservoir a] Create and store parameters (default) of known regional and other reservoirs, and classify to permit identification using data stored in SPIRAL computerized databases. Define: Reservoir Lithologies. Then, per lithology:

Classify by parameters already defined per point in space in SPIRAL, i.e.,

Depth,

Thickness,

Velocity [normalized+compaction+burial]

Age/History.

Then store from known reservoirs, per class:

Porosity,

Permeability,

Net/Gross b] Search SPIRAL project sequences, spatially, to identify volumes where a lithology exhibits SPIRAL-deduced parameters equivalent to a known economic reservoir. Then, using known lithology, velocity, depth, etc., calculate porosity, permeability, and net/gross, and compare/contrast with these parameters as known in reservoirs elsewhere.

Note mismatches and enter them to risk equation, with existing risks concerning data, deposition and burial.

2. Seal a] Create and store parameters (default) of known regional and other seals, and classify to permit identification using data stored in SPIRAL databases. Define: seal lithologies. Then, per lithology, classify by parameters already defined per point in space in SPIRAL, i.e., Depth, Thickness, Velocity (normalized +compaction +burial), Age/History.

Then store from known seals, per class:

Porosity,

Permeability b] Search SPIRAL project sequences, spatially, to identify volumes where a lithology exhibits Spiral deduced parameters equivalent to a known economic seal. Note also stratigraphic sequence lateral seals. Then, using project known lithology, velocity, depth, etc., calculate porosity, permeability, and compare/contrast with these parameters as known in seals elsewhere. Note mismatches and enter them to risk equation.

c] Search SPIRAL databases for spatial evidence of seal presence in a default (default) defined distance of a reservoir defined in 1 hereinabove. Define existing local risks concerning data, deposition and burial.

3. Trap.

a] Search SPIRAL defined sequence volumes, where a reservoir is spatially associated with a seal, to define structural / stratigraphic closures. Define:

Crest Depth,

Vertical Closure,

Gross Rock Vol.,

Age/History.

Define existing local risks concerning data, burial history.

4. Source.

a] Create and store parameters (default) of known regional and other sources. Define source lithologies. Then, per lithology, classify by parameters already defined per point in space in SPIRAL, i.e., Depth, Thickness, Velocity, (normalized,+compaction,+burial).

Then store from known sources, per class:

Porosity,

Permeability,

Richness,

Type.

b] Search SPIRAL project sequences, spatially, to identify volumes where a lithology exhibits SPIRAL-deduced parameters equivalent to a known economic source. Then, using project known lithology, depth, velocity etc., calculate porosity, permeability, and compare/contrast with these parameters as known in sources elsewhere. Note mismatches, and enter them to risk equation.

c] Define

Richness,

Volume,

Maturity,

Type, etc., from store & SPIRAL.

d] Search SPIRAL project sequences, spatially, to identify (default lateral or overlying) sealed, reservoir quality traps, in migration distance (default). Define migration route, e] Classify migration loss, (lithology/velocity/depth/volumes), in migration path. Define existing risk concerning data, deposition and burial.

5. Reserve in place/recoverable, per trap. Define fluid saturation, expansion factor, recovery factor, from known analogies. Define reserves. Assemble overall risks.

Stage C. Definition, per trap, of Reword, of oil/gas inplace & recoverable

Data required, spatially variable, if appropriate.

| Sequence Task | Property | SPIRAL | | analysis number |
|---|---|---|---|---|
| Reservoir | Lithology | | *$ | 1 |
| | Porosity | | *$ | 2 |
| | Age, History | *$ | | 3 |
| | Permeability*? | *? | | 4 |
| | Thickness | * | | 5 |
| | Net/Gross | *? | | 6 |
| Seal[s] | Lithology | | *$ | 1 |
| | Porosity | | * | 2 |
| | Age, History | *$ | | 3 |
| | Permeability | * | | 4 |
| | Thickness | | *$ | 5 |
| Trap | Crest Depth | *$ | | 7 |
| | Gross Rock Vol | *$ | | 8 |
| | Vertical Closure | | *$ | 9 |
| | Age, History | | *$ | 3 |
| | Degree of fill | | $ | 10 |
| | Fluid Saturation | | $ | 11 |
| | Expansion Factor | | * | 12 |
| | Recovery Factor | | * | 13 |
| | Post process tectonics*$ | | | 14 |
| | Reserve in place*? | | *? | 15 |
| | Recoverable Reserve | | | 16 |
| Source | Lithology | *$ | | 1 |
| | Porosity | *$ | | 2 |
| | Age, History | *$ | | 3 |
| | Permeability | *? | | 4 |
| | Volumes | *$ | | 8 |
| | Richness | *? | | 17 |
| | Maturity | * | | 18 |
| | Post process tectonics*$ | | | 14 |
| | Type | *? | | 19 |
| | Migration, loss | | *$ | 20 |
| Factors for definition = 20. | | | | |
| # | Definition & risk improved by SPIRAL = 12/20 | | | |
| #? | Probably improved by SPIRAL = 5/20 | | | |
| ? | Possibly improved by SPIRAL = 3/20 | | | |

The SPIRAL Process therefore integrates with applied industrial geophysics a group of industrial tasks currently performed in the areas of applied industrial geology & reservoir engineering. Since properties, and the risk associated with the derivation of those properties, are so interrelated, it is appropriate to reduce industrial disciplinary demarcations.

Advantages

Processes described as SPIRAL, in accordance with the present invention, involve a theme which is clearly new and innovative in the art, will act to reduce the relative cost of location and development of hydrocarbon resources, and will probably surprise artisan in oil industry exploration & production that the processes described are not in industrial or even academic use. It should be clear to those skilled in the art that SPIRAL, building upon the innovations taught by BECVEM, is not a simple extension to BECVEM, but is instrumental in allowing separate working of a plurality of factors, such that those remaining become increasingly isolated for more accurate industrial use via the SPIRAL processes.

The application of the disclosure herein to the new work domain described, in which lithology, compaction, and velocity are treated as a product of depositional and post depositional processes, has allowed a suite of new processes to be invented to work in conjunction with methods and means already known to those skilled in the art, and to open many roads of industrial economic importance.

Thus, the present invention, as clearly demonstrated herein:

Creates new control zones associated with improved sequence parameter definition, permitting improved time sequence boundary and internal property definition.

Increases valid data, readily accessible in computerized databases, relating to the properties of deposited sequence sediments.

Allows conversion from time to depth with improved accuracy in three dimensions of seismic derived sequence material data.

Allows conversion with improved accuracy between seismic acoustic impedance and seismic derived lithology.

Allows seismic sequence lithologies of economic importance to be spatially isolated with improved efficiency and accuracy.

Provides a mechanism whereby the physical and economic relationship between source/migration route/reservoir/seal / trap, can be ascertained, stored in databases and exploited with improved accuracy and risk.

Provides a mechanism whereby an integrated industrial process can occur with improved effect relative to several component processes, with improved efficiency and accuracy.

Provides a mechanism whereby the physical and economic relationship between source/migration route/seal/trap, can be ascertained, stored in databases and exploited with improved accuracy and risk.

Provides a mechanism whereby an integrated, computerized industrial process can be constructed with improved effect relative to implementation of the several component parts.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. In a basin environment encompassing sedimentary rocks disposed insitu in subsurface sequences, from which well log data, including sonic data, have been obtained downhole, and from which seismic time sections and seismic velocity data derived from spectra, at discrete locations, have been obtained, a computerized method of evaluating velocity distributions and interpreting spatial distributions of said subsurface sequences, and of interpreting depositional and post-depositional and resolution errors thereof, for exploring and prospecting for subsurface hydrocarbon reservoir, seal, trap or source, said method comprising the steps of:

converting said seismic velocity data to reveal presence of seismic lithological sequences;

determining spatial velocity behavior of said seismic lithological sequences at available points of velocity control;

plotting interval velocity versus depth for said velocity control, for each sequence of said seismic lithological sequence, to determine compaction characteristics;

ascertaining apparent lithology related to said sedimentary rocks at the depth and velocity established from said determining spatial velocity behavior and plotting interval velocity versus depth steps;

constraining said sequence velocity distribution by applying adjustable filters which identify and reject evidence of velocity behavior deemed to be impossible on the basis of estimated depth, velocity, compaction and lithology, for prognosticating locations in said basin environment for exploring and prospecting for said subsurface hydrocarbon reservoir, seal, trap or source; and storing said rejected velocity evidence and its associated location parameters in a database for use in subsequent analysis of said subsurface sequences.

2. The method recited in claim 1, wherein said available points of control in said step of determining spatial velocity behavior of said seismic lithological sequences includes well velocity control.

3. The method recited in claim 1, wherein said available points of control in said step of determining spatial velocity behavior of said seismic lithological sequences includes seismic velocity control.

4. In a basin environment encompassing sedimentary rocks disposed insitu in subsurface sequences, from which well log data, including sonic data, have been obtained downhole, and from which seismic time sections and seismic velocity data derived from spectra, at discrete locations, have been obtained, a computerized method of evaluating velocity distributions and interpreting spatial distributions of said subsurface sequences, and of interpreting depositional and post-depositional and resolution errors thereof, for exploring and prospecting for subsurface hydrocarbon reservoir, seal, trap or source, said method comprising the steps of:

converting said seismic velocity data to reveal presence of seismic lithological sequences:

constructing a work domain having parameters of time, velocity, compaction, depth and lithology, to be worked at said locations, for each sequence of said seismic lithological sequences, in conjunction with a seismic waveform;

adapting said work domain to accommodate a subdivision of said parameters into all component parts thereof, with each of said component parts associated with a change of said parameters, sufficient to cause error exploring and prospecting for aid hydrocarbon reservoir, seal, trap or source;

sensitizing said adapted work domain to a description of geophysically defined geology, as a combination of resolution error, depositional geology and burial change to geology, such that all spatial changes in said time, velocity, compaction, depth and lithology are defined on the basis of said combined changes;

spatially quantifying a majority of sequence burial changes and isolating said burial changes in filters;

removing effects of said burial changes from apparent velocity to obtain treated depositional properties and velocity error and resolution error;

constraining said treated depositional properties to act in accordance with deposition lithology, environment and form;

resolving said apparent sequence velocity distribution to cause, per reference point, two new parameters for present depth and velocity, and having normalized burial lithology expressed as corresponding normalized velocity and compaction; and integrating all separate causes of parameter change, laterally in sequences, and vertically between sequences, to quantify the extent to which each performs in a geologically verifiable manner, for prognosticating locations in said basin environment for exploring and prospecting for said subsurface hydrocarbon reservoir, seal, trap or source.

5. The method recited in claim 4, wherein said reference point in said resolving step includes a grid point.

6. The method recited in claim 4, wherein said reference point in said resolving step includes a shot point.

7. In a basin environment encompassing sedimentary rocks disposed insitu in subsurface sequences, from which well log data, including sonic data, have been obtained downhole, and from which seismic time sections and seismic velocity data derived from spectra, at discrete locations, have been obtained, a computerized method of evaluating velocity distributions and interpreting spatial distributions of said subsurface sequences, and of interpreting depositional and post-depositional and resolution errors thereof, for exploring and prospecting for subsurface hydrocarbon reservoir, seal, trap or source, said method comprising the steps of:

converting said seismic velocity data to reveal presence of seismic lithological sequences;

accessing a compilation of geologic data using said seismic lithological sequences, such that a range of properties relevant to definition of source, seal, reservoir and migration route may be searched in said compilation to obtain a match, appropriate to classify said seismic lithological sequences derived per sequence, per grid point;

generating maps and cross sections from said classifications to display sequence behavior in terms of said source, seal, reservoir and migration route;

selecting reservoirs based upon said maps and cross sections which are sealed and structurally and stratigraphically closed and configured as traps;

determining risk for each of said classifications that said range of properties is not likely to be proven, per gridpoint, per sequence; and assembling individual sequence, grid area material evidence from said risk determination for prognosticating locations in said basin environment for exploring and prospecting for said subsurface hydrocarbon reservoir, seal trap or source.

\* \* \* \* \*